(12) United States Patent  
Suzuki

(10) Patent No.: US 8,856,952 B2
(45) Date of Patent: Oct. 7, 2014

(54) BLADE, COMPUTER PRODUCT, AND MANAGEMENT METHOD

(71) Applicant: Fujitsu Limited, Kawasaki (JP)

(72) Inventor: Takeshi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 83 days.

(21) Appl. No.: 13/852,210

(22) Filed: Mar. 28, 2013

(65) Prior Publication Data

US 2013/0219513 A1    Aug. 22, 2013

Related U.S. Application Data

(63) Continuation of application No. PCT/JP2010/069108, filed on Oct. 27, 2010.

(51) Int. Cl.
*G06F 17/00* (2006.01)
*G06F 21/10* (2013.01)

(52) U.S. Cl.
CPC ..................................... *G06F 21/10* (2013.01)
USPC ...... 726/27; 726/2; 726/5; 713/189; 709/224; 705/59

(58) Field of Classification Search
USPC ................... 726/9, 24, 27; 713/189; 709/217; 705/325, 76; 711/103, 112, 115
See application file for complete search history.

(56) References Cited

U.S. PATENT DOCUMENTS

2004/0254888 A1* 12/2004 Tanaka et al. ................... 705/59
2006/0161972 A1*  7/2006 Cromer et al. ................... 726/5
2006/0265378 A1* 11/2006 Koseki ............................. 707/9
2007/0011311 A1*  1/2007 Kawaji et al. ................. 709/224
2007/0083679 A1*  4/2007 Kikuchi ........................... 710/8
2010/0024001 A1*  1/2010 Campbell et al. ................ 726/2
2010/0250960 A1*  9/2010 Ogura ........................... 713/189

FOREIGN PATENT DOCUMENTS

| JP | 5-346851 | 12/1993 |
|---|---|---|
| JP | 2005-4448 | 1/2005 |
| JP | 2006-323451 | 11/2006 |
| JP | 2006-338229 | 12/2006 |
| JP | 2007-66189 | 3/2007 |
| JP | 2008-97164 | 4/2008 |
| JP | 2008-107879 | 5/2008 |
| JP | 2008-158639 | 7/2008 |
| WO | WO 2008/026570 | 3/2008 |

OTHER PUBLICATIONS

PCT Preliminary Report on Patentability mailed May 23, 2013 in corresponding International Application No. PCT/JP2010/069108.
International Search Report of PCT/JP2010/069108 mailed Jan. 25, 2011.

* cited by examiner

*Primary Examiner* — Beemnet Dada
*Assistant Examiner* — Sayed Beheshti Shirazi
(74) *Attorney, Agent, or Firm* — Staas & Halsey LLP

(57) ABSTRACT

A determining unit determines whether housing specific information decrypted from a license key is identical to housing specific information acquired from the housing to confirm legitimacy of license, thereby ensuring security. The determining unit determines that the license can be activated if a usage number in the housing does not exceed a usable number. Only when the determining unit determines that the license can be activated, the setting unit activates the license to make software usable so that any blade can freely use the software within a limit of the usable number.

11 Claims, 28 Drawing Sheets

FIG.1
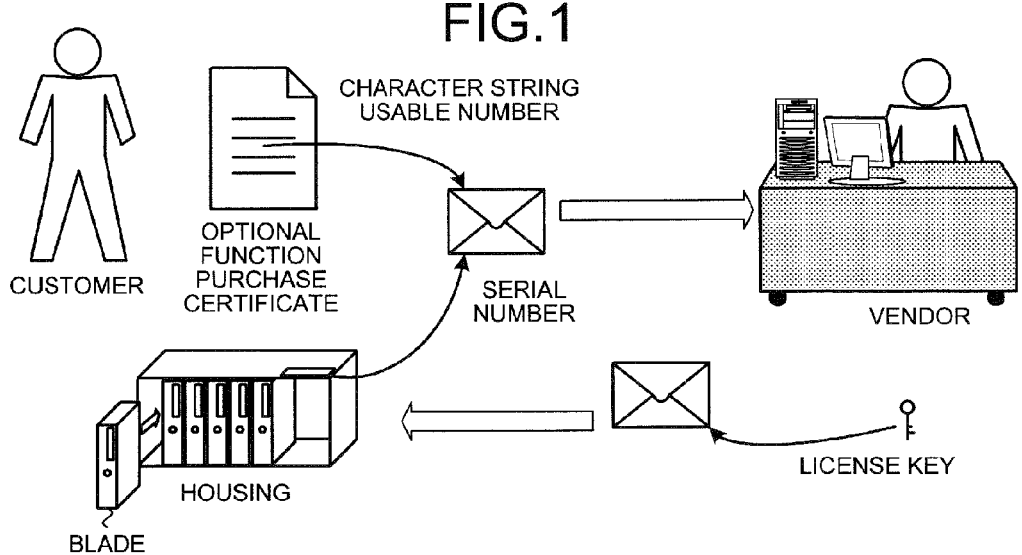
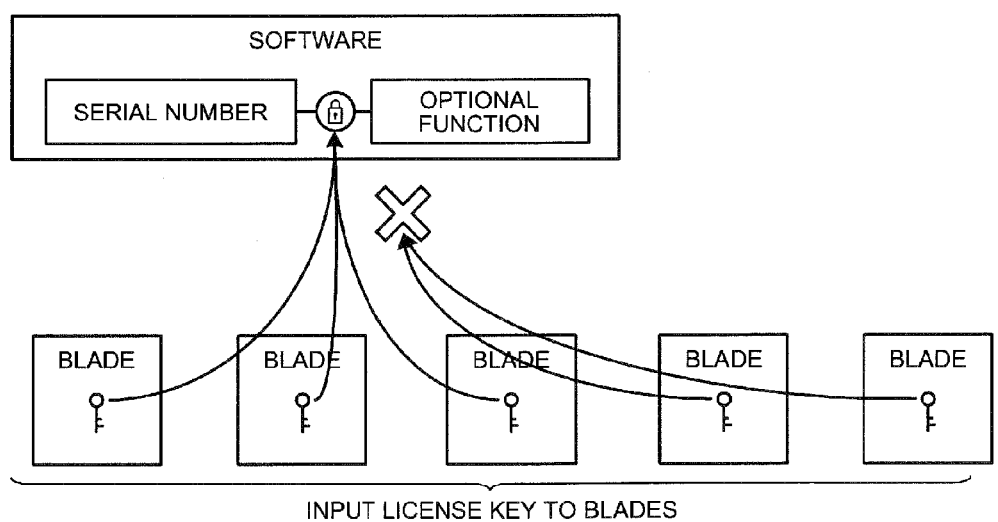

| HOUSING SPECIFIC INFORMATION | xyz1233321zyx |
|---|---|
| USABLE NUMBER | 3 |
| USAGE NUMBER | 2 |
| PRIORITY | 2 |
| PRIORITY (comp) | 1 |
| LICENSE STATUS | ACTIVATED |
| LICENSE KEY | abc987789cba |
| FAILURE BIT | 0 |

FIG.11
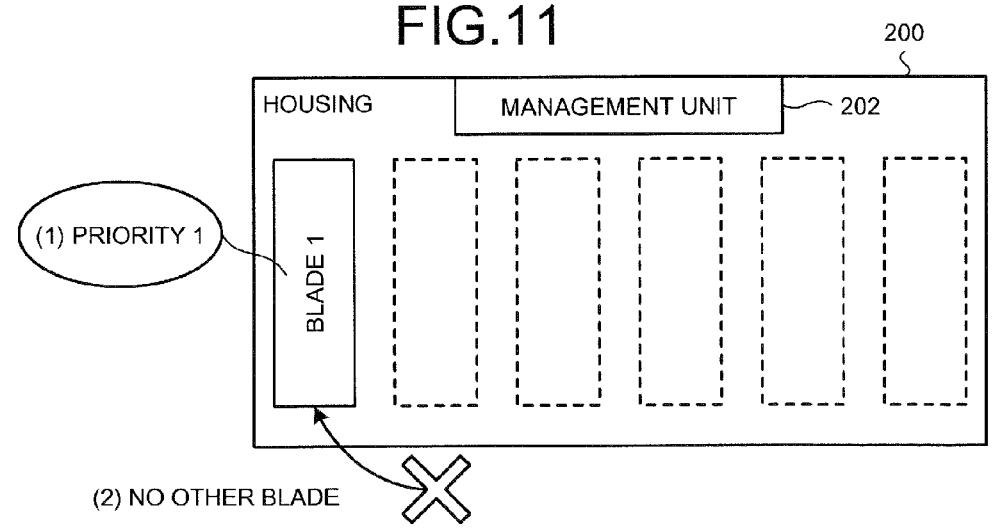
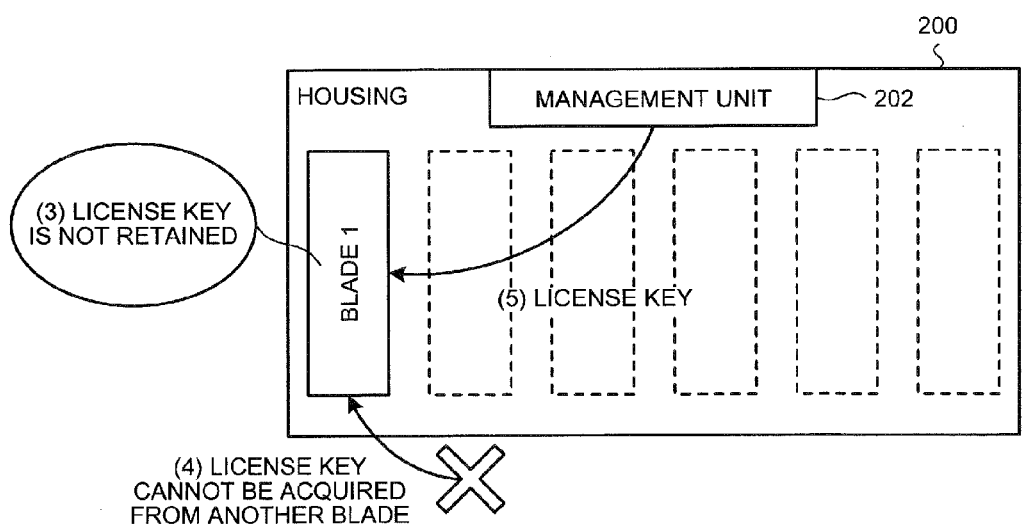
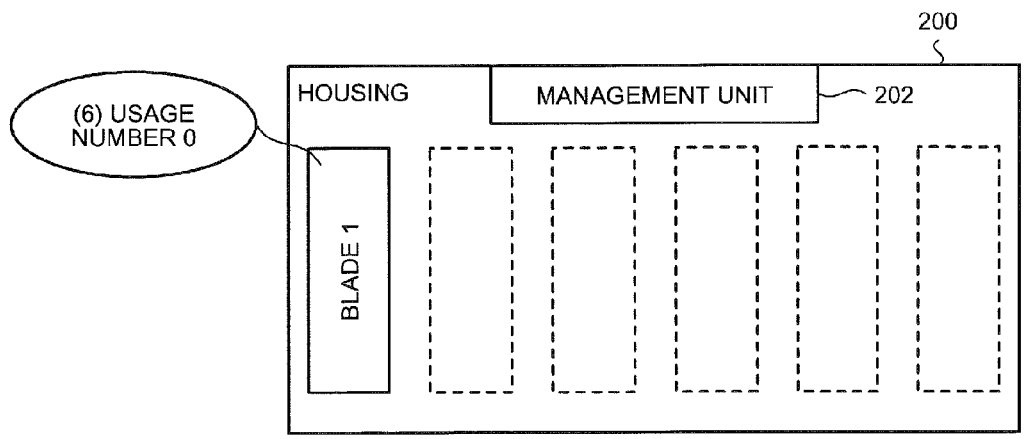

FIG.12
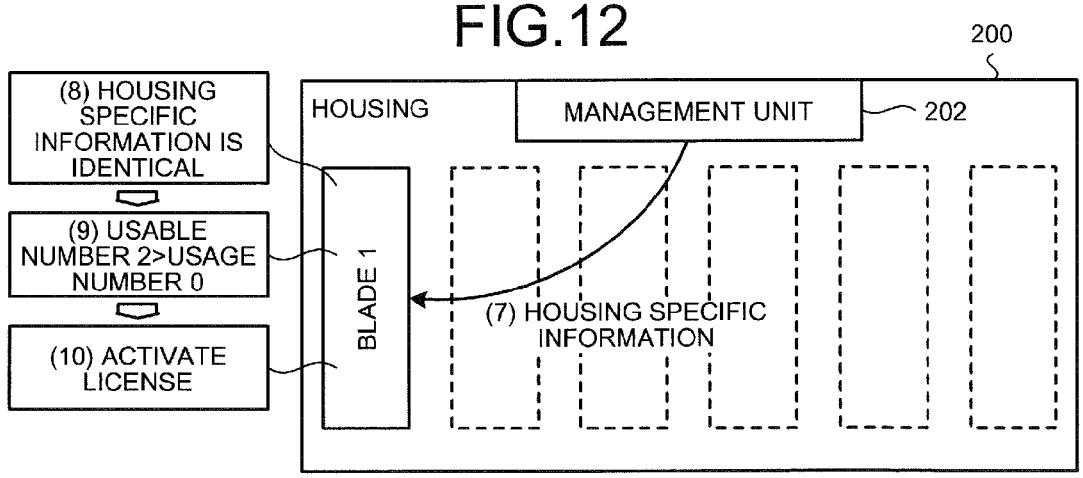
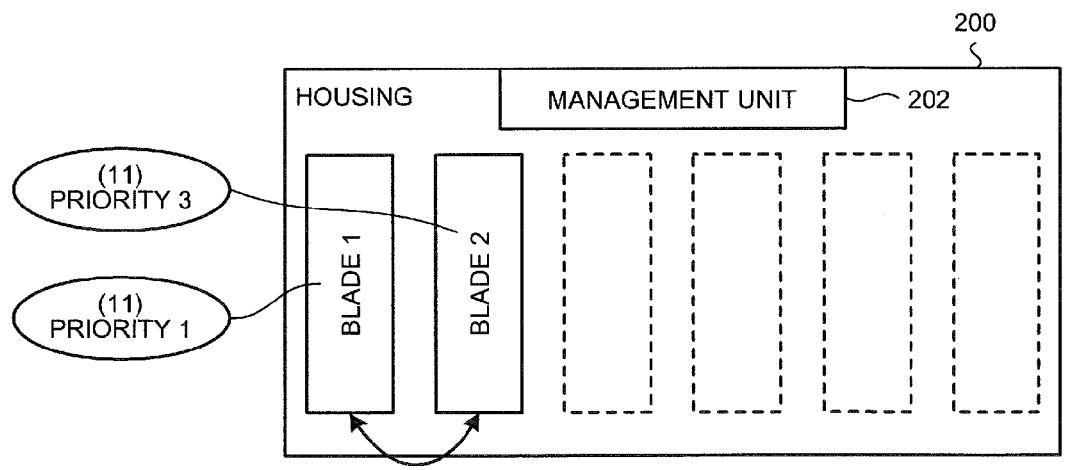
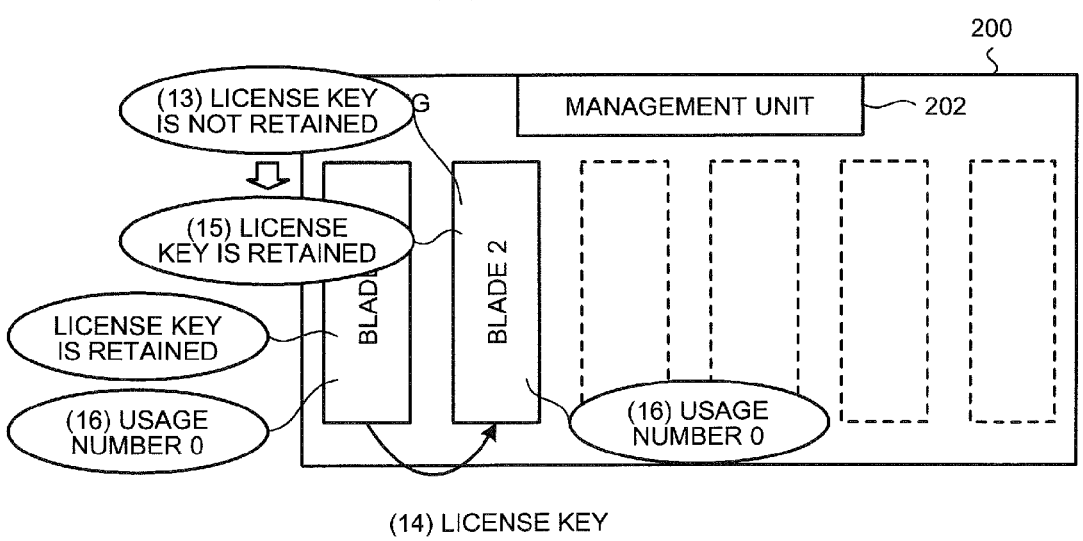

FIG.14
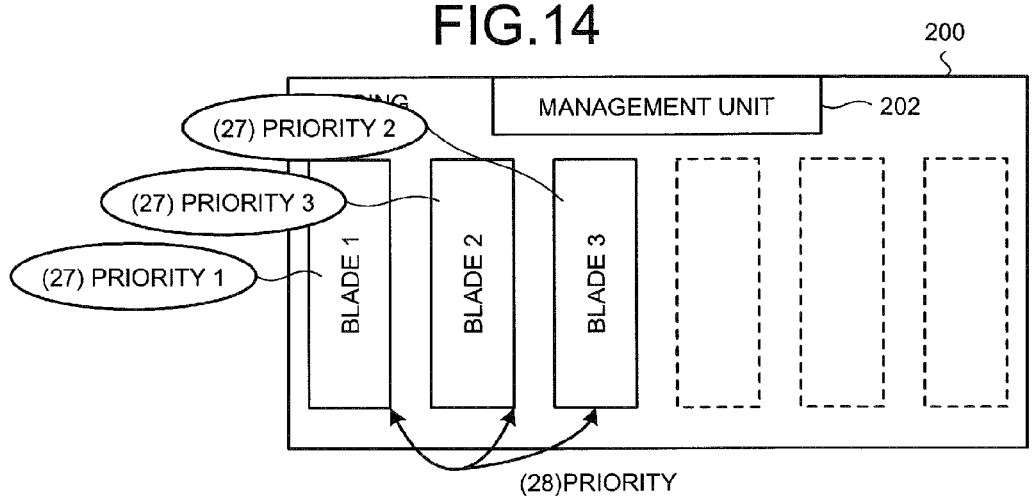
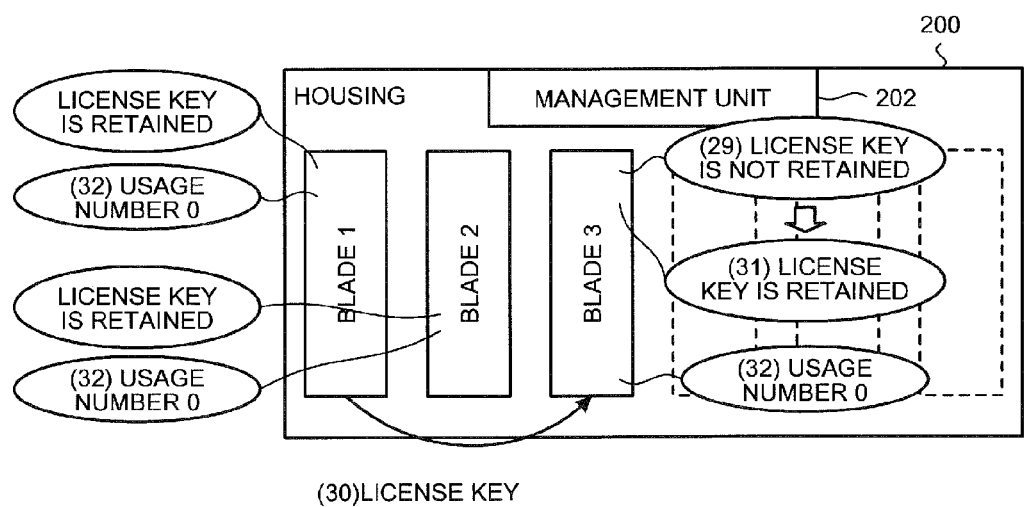
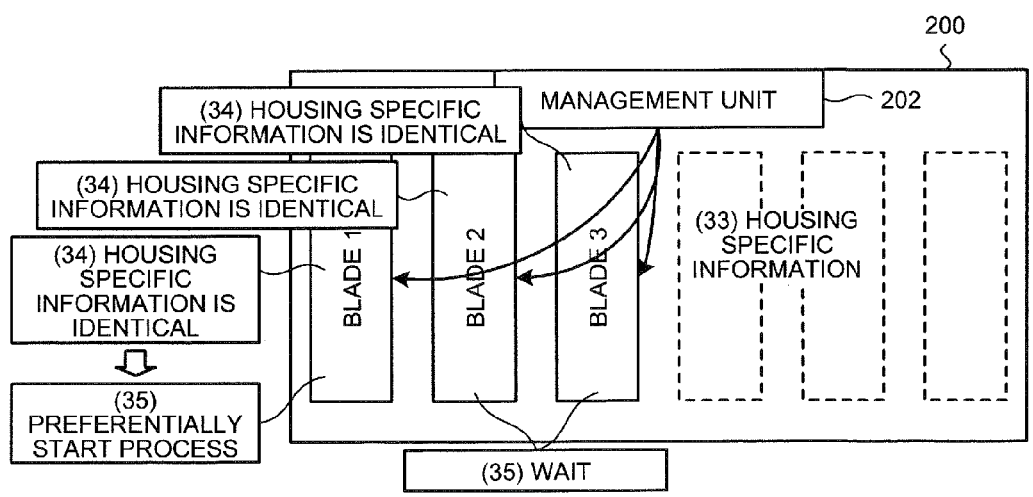

FIG.16
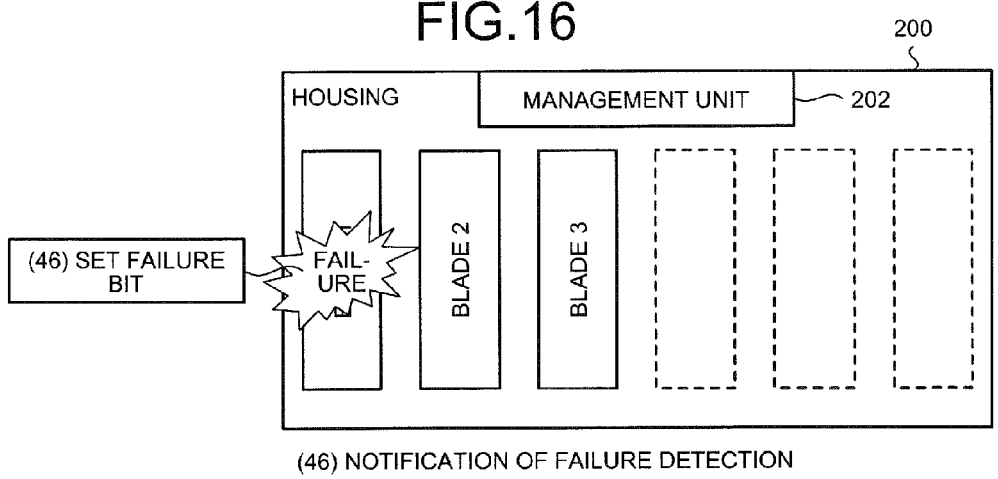
(46) NOTIFICATION OF FAILURE DETECTION
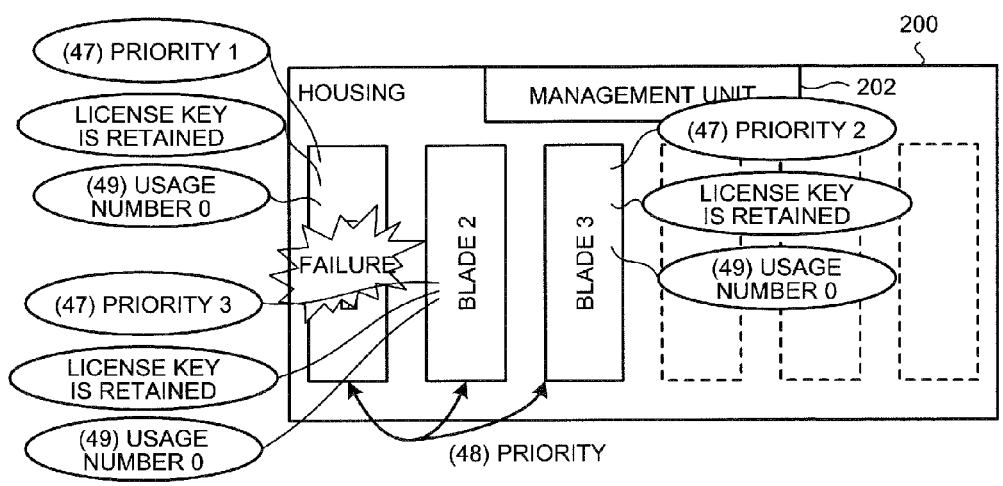
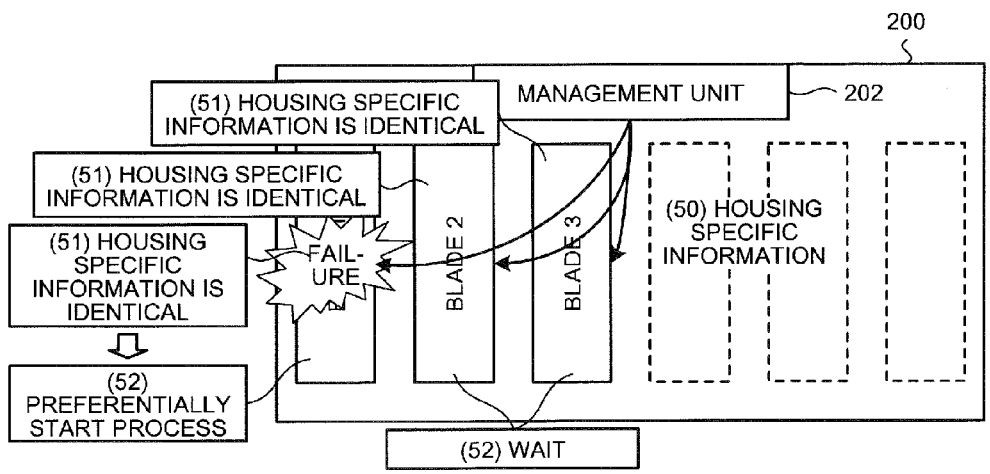

FIG.26
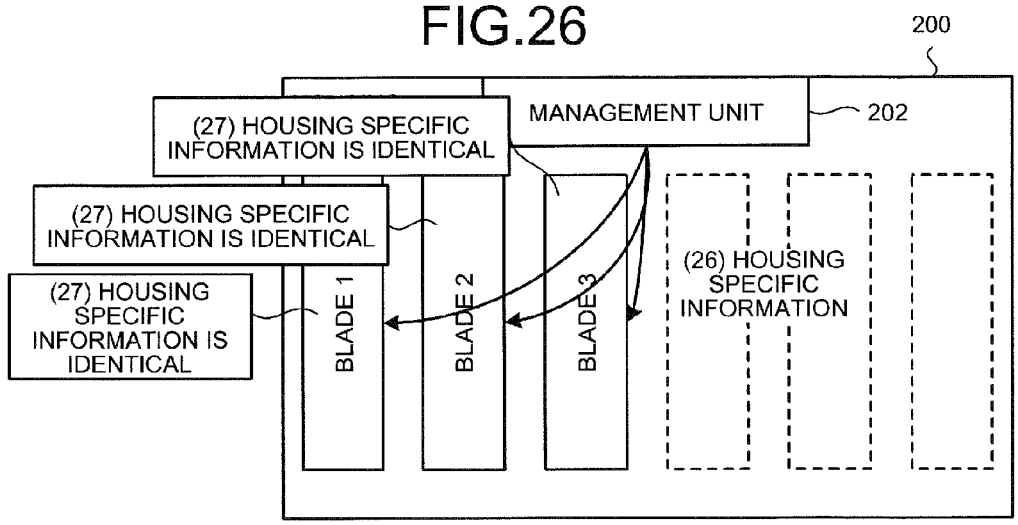
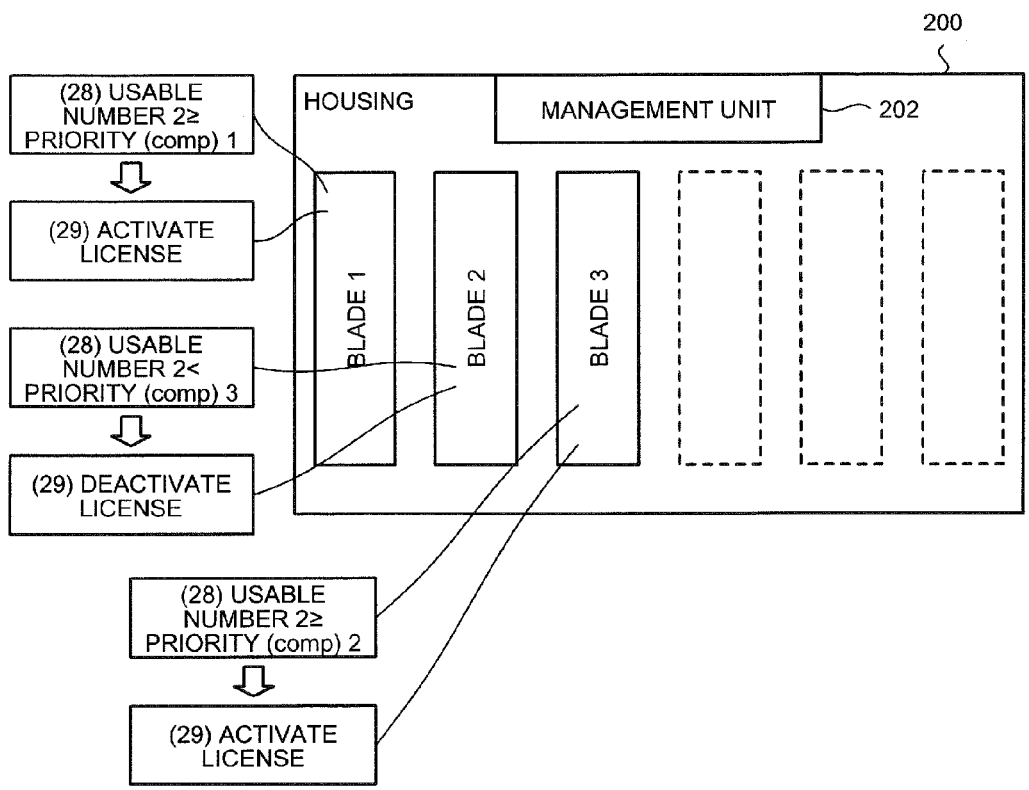

FIG.27
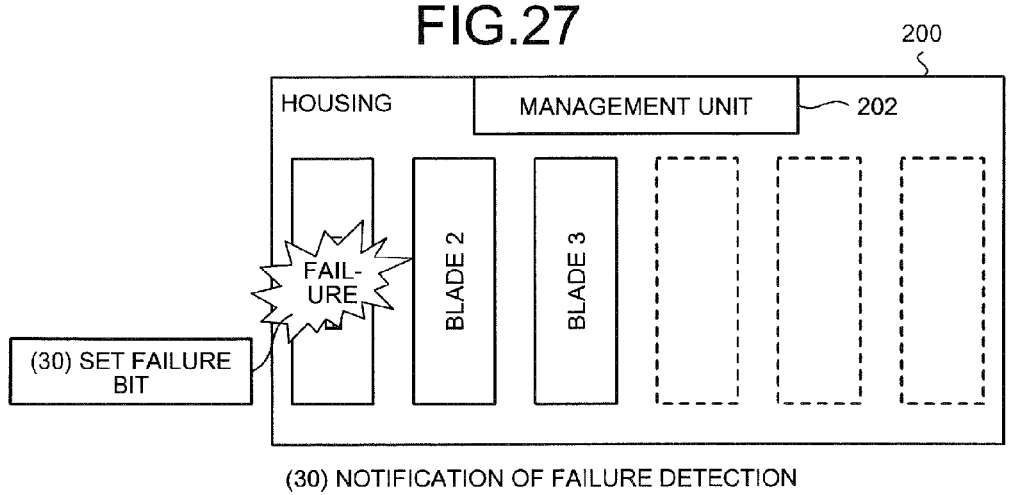
(30) NOTIFICATION OF FAILURE DETECTION
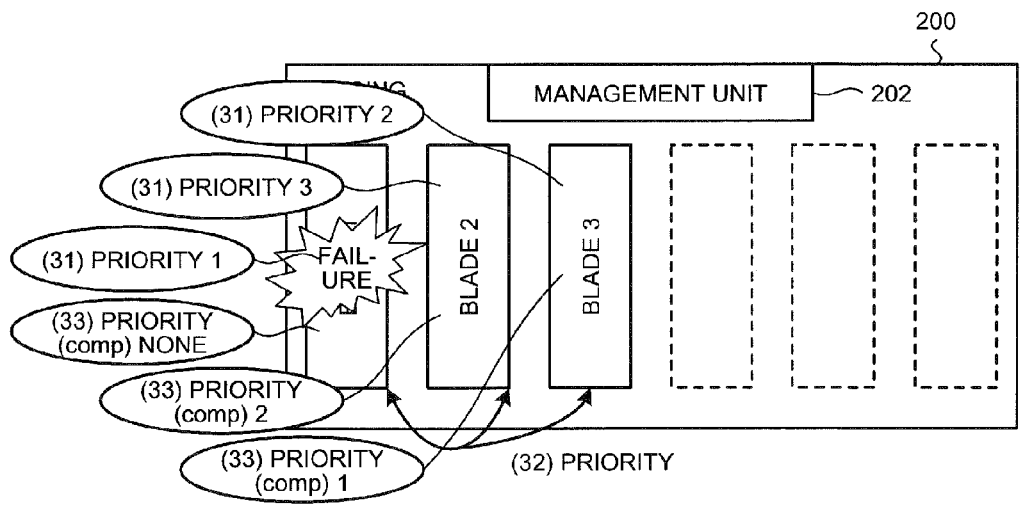
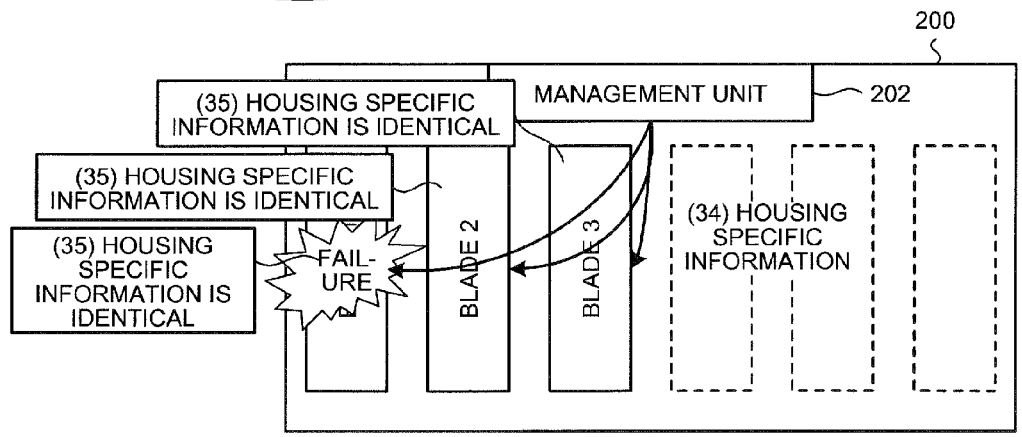

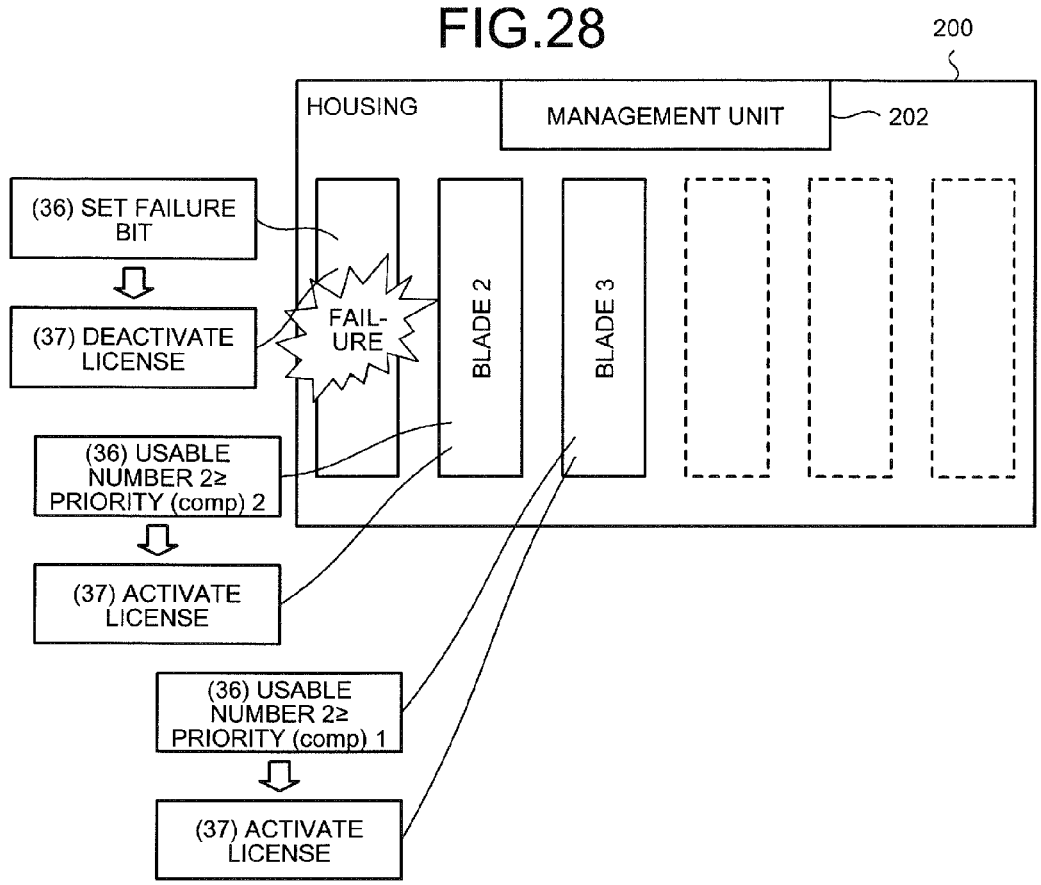

BLADE, COMPUTER PRODUCT, AND MANAGEMENT METHOD

CROSS REFERENCE TO RELATED APPLICATIONS

This application is a continuation application of International Application PCT/JP2010/069108, filed on Oct. 27, 2010 and designating the U.S., the entire contents of which are incorporated herein by reference.

FIELD

The embodiments discussed herein are related to a blade, a computer product, and a management method managing/operating license.

BACKGROUND

Blade servers capable of power supply and air-conditioning management of blades in an integrated manner are recently used in offices so as to save office space. A blade server is configured by connecting blades to a housing disposed with insertion ports for attaching and removing blades.

Software used on these blades can easily be duplicated and modified and may be used without authorization. Therefore, a vendor supplying the software incorporates a software lock into the software to prevent unauthorized use of the software or an optional function of the software. A license key for permitting the use of software is given only to licensed users.

The vendor may lock a license key for software (particularly, valuable software) to blade-specific information such that only one certain predefined blade fixedly uses the software (node-locked license). The blade-specific information is a Media Access Control address (MAC address) or World Wide Name (WWN), for example.

On the other hand, a vendor sets the number of licenses that can concurrently use software on a network (hereinafter referred to as "usable number") in some licensing methods. If the number of licenses concurrently using software (hereinafter referred to as "usage number") is within a limit of the usable number, users can freely use the software (floating license).

In the case of the floating license, a license management unit is provided that connects with multiple blades via a local area network (LAN) to manage the number of issued license keys over a network. The license management unit issues license keys and manages the number of issued license keys such that the usage number does not exceed the usable number, thereby preventing unauthorized use of software. The license can be transferred via a LAN between blades.

For examples of such technologies, refer to Japanese Laid-Open Patent Publication Nos. 2008-107879, 2008-158639, and H5-346851.

However, the node-locked license requires all the blades possibly using software to have licensing. Therefore, even a blade of a standby system not operated in a normal situation must have licensing. If a blade is replaced, blade-specific information is different between before and after the blade replacement and, therefore, the license of the blade before replacement is not usable for a blade after replacement, preventing prompt transfer of licensing, causing a problem in that licensed operation is disrupted.

On the other hand, the transfer of license through a LAN in the case of the floating licensing causes a problem in that software may be used without authorization by intentionally detaching a blade from the LAN during transfer of licensing.

It is also problematic that software may be used without authorization by improperly modifying a management unit, for example, by rewriting the usable number or the number of issuance.

SUMMARY

According to an aspect of an embodiment, a blade removable from a housing of a blade server, the blade comprising a processor configured to receive from another blade in the housing, a first license number indicative of a number of licenses that can use a function of given software and identification information specific to the housing; acquire from the housing, identification information specific to the housing; determine whether the received identification information is identical to the acquired identification information, and upon determining the identification information to be identical, further determine whether the function of the given software is usable by comparing the first license number with a second license number indicative of a number of blades in the blade sever using the function of the given software; set the blade to a state in which the function of the given software is executable upon determining that the function of the given software is usable; update the second license number upon setting the blade; and transmit to a blade in which the function of the given software is not set among the blades in the blade server, the first license number and the updated second license number.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory view of details of license key acquisition and license activation;

FIGS. 11, 12, 13, 14, 15, 16, and 17 are explanatory views of a specific example of the first embodiment;

FIGS. 23, 24, 25, 26, 27, and 28 are explanatory views of a specific example of the second embodiment;

DESCRIPTION OF EMBODIMENTS

Figure 2:
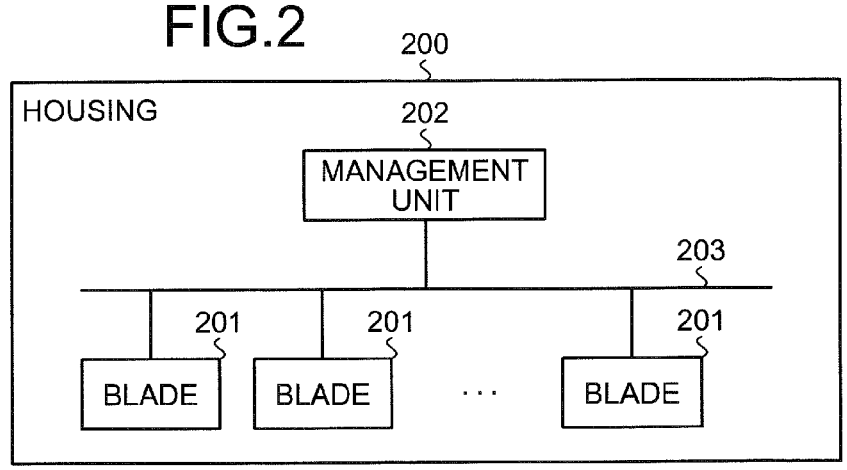
FIG. 2 is a block diagram of a hardware configuration of a housing that includes multiple blades.

Embodiments of a license management apparatus according to the present invention will be described in detail with reference to the accompanying drawings. In the examples described in the following embodiments, license activation enables use of an optional function of software; however, configuration may be such that license activation enables use of the function of the software itself. License key acquisition and license activation will be described with reference to FIG. 1.

FIG. 1 is an explanatory view of details of license key acquisition and license activation. If a customer purchases an optional function of software, a vendor transmits an optional function purchase certificate. The optional function is a function that can be added to basic functions of software under a certain condition (purchase of the optional function). For example, if software is CAD software, the optional function is a function specialized for semiconductor design or structure design other than basic functions of drawing for general purposes.

The optional function purchase certificate has descriptions of character strings indicating that the optional function purchase certificate is officially sold by the vendor, and the usable number. The optional function may be purchased on the Web or from a shop. The optional function purchase certificate may be transmitted via e-mail or sent by post.

A procedure of acquisition of a license key from a vendor by a user will be described. As depicted in FIG. 1, a customer transmits to the vendor the character string and the usable number described on the purchased optional function purchase certificate and specific information of a housing equipped with blades using the optional function (in this case, e.g., the serial number of the housing).

The vendor confirms the validity of the optional function purchase certificate of the customer by confirming that the received character string is the issued character string and is not actually used in the past and that the usable number requested from the customer is identical to the usable number purchased by the customer. If the validity of the optional function purchase certificate of the customer is confirmed, the vendor combines the received character string and usable number with the specific information of the housing and transmits to the customer a license key acquired by encrypting the combined information.

A procedure of activating licensing of a blade will be described. The customer inputs the received license key to the blade. The blade has a decryption key and decrypts the license key to acquire the character string, the usable number, and the specific information of the housing. The blade checks whether the housing specific information acquired from the housing is identical to the housing specific information acquired by encrypting the license key. If the information is identical, the blade can activate a license to use the optional function within a limit of the usable number.

For example, if the usable number is three, as depicted in FIG. 1, the license can be activated to use the optional function up to a third blade; however, a fourth blade or subsequent blade cannot activate the license.

Although the customer purchases an optional function of software in this description, the customer may purchase the software itself. In this case, a software purchase certificate is transmitted from a vendor and a blade activates licensing to enable use of the function of the software itself.

A hardware configuration of a housing including multiple blades will be described with reference to FIGS. 2 to 4. The housing is a chassis having a management unit and disposed with insertion ports for attaching and removing the multiple blades. The housing has a bus for communication between the blades. The insertion ports have connectors for connecting the blades to the bus. The management unit is a unit managing the multiple blades connected to the housing via the bus. The management unit is fixed to the housing. Each of the multiple blades is a computer operating independently of the other blades and communicable with the other blades via the bus. The housing connected to the blades is referred to as a blade server.

FIG. 2 is a block diagram of a hardware configuration of a housing that includes multiple blades. In FIG. 2, a housing (blade server) 200 includes multiple blades 201 and a management unit 202. The constituent units are connected through a bus 203.

A blade server is configured such that the blades 201 can be connected to the bus 203 by using the connectors in the insertion ports. Each of the blades 201 can be attached/removed with the housing 200 left powered on and a system can be expanded/modified while the blades 201 other than those to be added/replaced continue operations.

Figure 3:
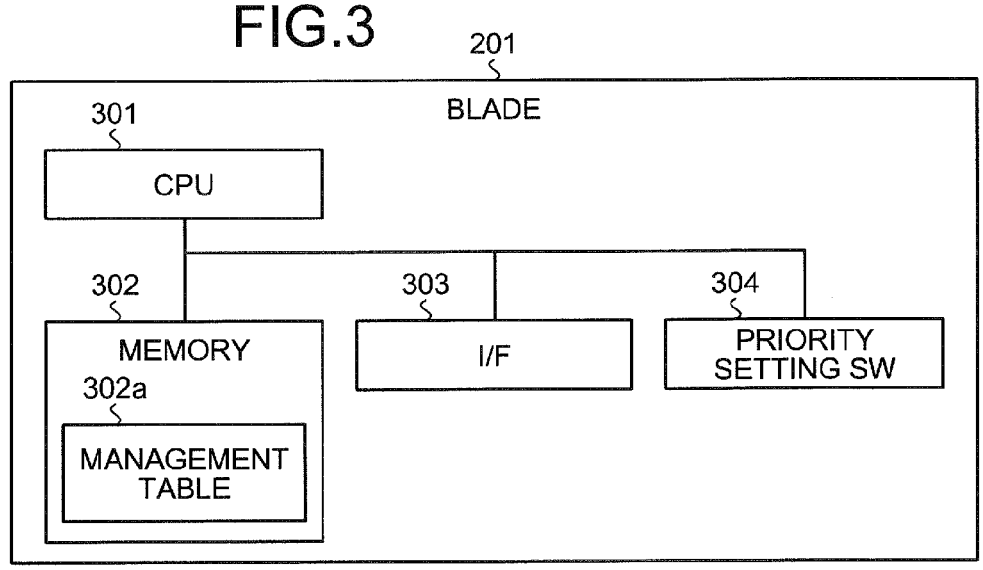
FIG. 3 is a block diagram of a hardware configuration of a blade.

FIG. 3 is a block diagram of a hardware configuration of the blade 201. In FIG. 3, the blade 201 includes a central processing unit (CPU) 301, memory 302, an interface (I/F) 303, and a priority setting switch (SW) 304.

The CPU 301 is responsible for overall control of the blade 201. The memory 302 stores programs such as a boot program. The memory 302 stores a management table 302a. The I/F 303 is connected to the bus 203 and is connected via the bus 203 to other apparatuses. The I/F 303 is responsible for an internal interface with the bus 203 and controls the input and output of data with respect to an external apparatus.

The priority setting SW 304 is a switch for retaining priority setting of the blade 201. The priority is a degree indicative of which of the blades 201 preferentially activates licensing. For example, a DIP switch is employed as this switch. The priority may be retained in a non-volatile memory.

Figure 4:
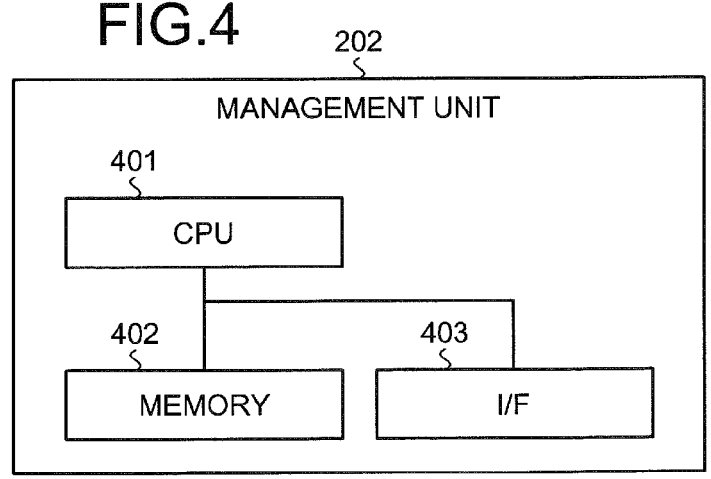
FIG. 4 is a block diagram of a hardware configuration of a management unit.

FIG. 4 is a block diagram of a hardware configuration of the management unit 202. In FIG. 4, the management unit 202 includes a CPU 401, a memory 402, and an I/F 403.

The CPU 401 is responsible for overall control of the management unit 202. The memory 402 stores programs such as a boot program. The I/F 403 is connected to the bus 203 and the management unit 202 is connected to other apparatuses via the bus 203. The I/F 403 is responsible for an internal interface with the bus 203 and controls the input and output of data with respect to an external apparatus.

Figure 5:
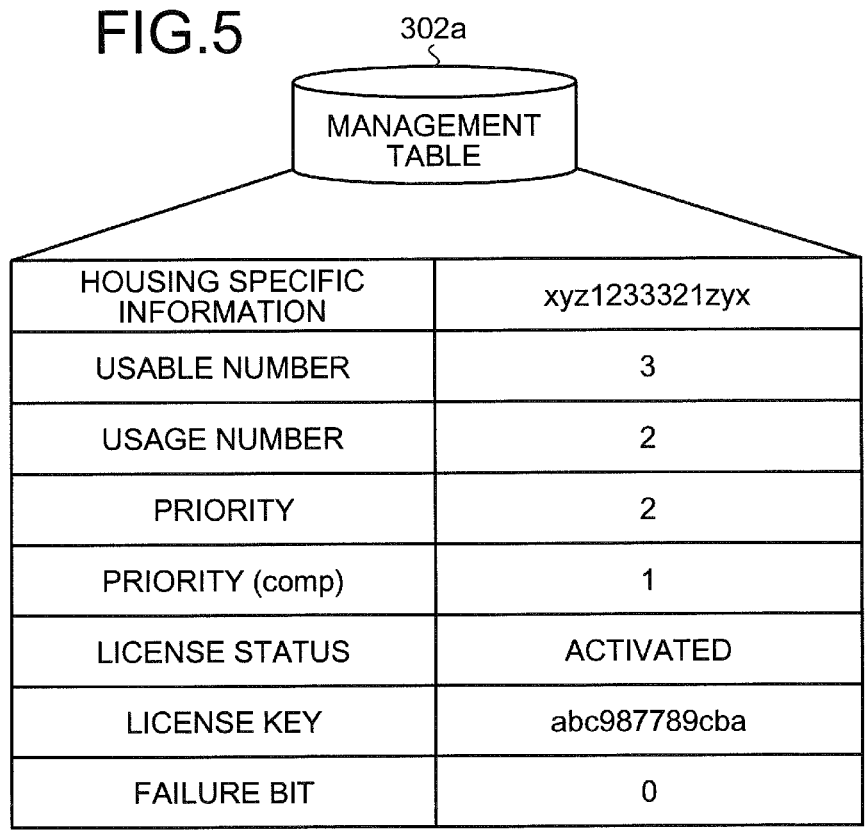
FIG. 5 is an explanatory view of a configuration of a management table.

FIG. 5 is an explanatory view of a configuration of the management table 302a. As depicted in FIG. 5, the management table 302a includes a housing specific information field, a usable number field, a usage number field, a priority field, a priority (comp) field, a license status field, a license key field, and a failure bit field.

The housing specific information field stores specific information of the housing 200 connected to the blade 201 (hereinafter referred to as "housing specific information"). The housing specific information is stored in advance in the memory 402 of the management unit 202. The blade 201 acquires and writes the housing specific information from the management unit 202 into the housing specific information field. The housing specific information may be any information capable of uniquely identifying the housing 200. For example, the serial number of the housing 200 is employed.

The usable number field stores the usable number in the housing 200 acquired by the blade 201 decrypting the license key. The usable number is the number of licenses that can concurrently use the optional function of the software on a network. The usable number may be the number of licenses that can concurrently use the function of the software itself on a network.

The usage number field stores the number of the blades 201 activating the license of the optional function of the software. The usage number field stores the number of the blades 201 activating the license of the function of the software itself. The usage number is incremented each time a blade activates the license.

The priority field stores priority set by the priority setting SW 304 to the blade. The priority (comp) field stores a number corresponding to the blade out of consecutive numbers starting with one. The priority is priority arbitrarily set by a user and is a fixed value. On the other hand, the priority (comp) is, for example, a value (hereinafter referred to as "rank") acquired when the blade 201 sorts the priorities of all the blades in the housing 200 and obtains where the priority of the blade is ranked from the top, and is recalculated each time a change is made in the operation state.

Therefore, for example, the priorities of blades 1 to 3 in the housing 200 are set to "1, 6, 4", respectively, the priorities (comp) of the blades 1 to 3 are set to "1, 3, 2", respectively. If the blade 3 is removed from the housing 200, the priorities (comp) are recalculated and the priorities (comp) of the blades 1 and 2 are set to "1, 2", respectively. An example of using the priority will be described later in a first embodiment and an example of using the priority (comp) will be described later in a second embodiment.

The license status field stores a status of license of the blade. The status of license includes, for example, "valid (judged)", "invalid (judged)", "valid (during judgment)", and "invalid (during judgment)".

"Valid (judged)" is a status when the blade 201 is in a normal operation state after completion of validity/invalidity judgment of the license of the blade 201 and the license of the blade 201 is valid. "Invalid (judged)" is a status when the blade 201 is in a normal operation state after completion of validity/invalidity judgment of the license of the blade 201 and the license of the blade 201 is invalid.

"Valid (during judgment)" is a status during validity/invalidity judgment of the license of the blade 201 when the license was valid before the judgment. This enables the license of the blade 201 to be maintained valid until completion of the validity/invalidity judgment of the license. Therefore, if the license must be judged again because of replacement or addition of the blade 201, termination of operation can be prevented from occurring due to setting the license invalid.

"Invalid (during judgment)" is a status during validity/invalidity judgment of the license of the blade 201 when the license was valid before the judgment or a status during the first validity/invalidity judgment of the license of the blade 201. This enables the license to be maintained invalid until completion of the validity/invalidity judgment of the license. Therefore, usage beyond the limit of the usable number can be prevented to ensure security.

The license key field stores a license key acquired from the management unit 202. The license key is a character string created by encrypting the character string and the usable number described in the optional function purchase certificate and the housing specific information. The blade 201 can decrypt the license key to acquire the usable number and the housing specific information. The software purchase certificate described above may be available instead of the optional function purchase certificate.

The failure bit field stores whether the blade is in the normal operation state or is in failure. For example, zero and one are assigned to the time of the normal operation state and the time of failure, respectively. When detecting a failure of the blade 201, the blade 201 sets one as the failure bit.

Figure 6:
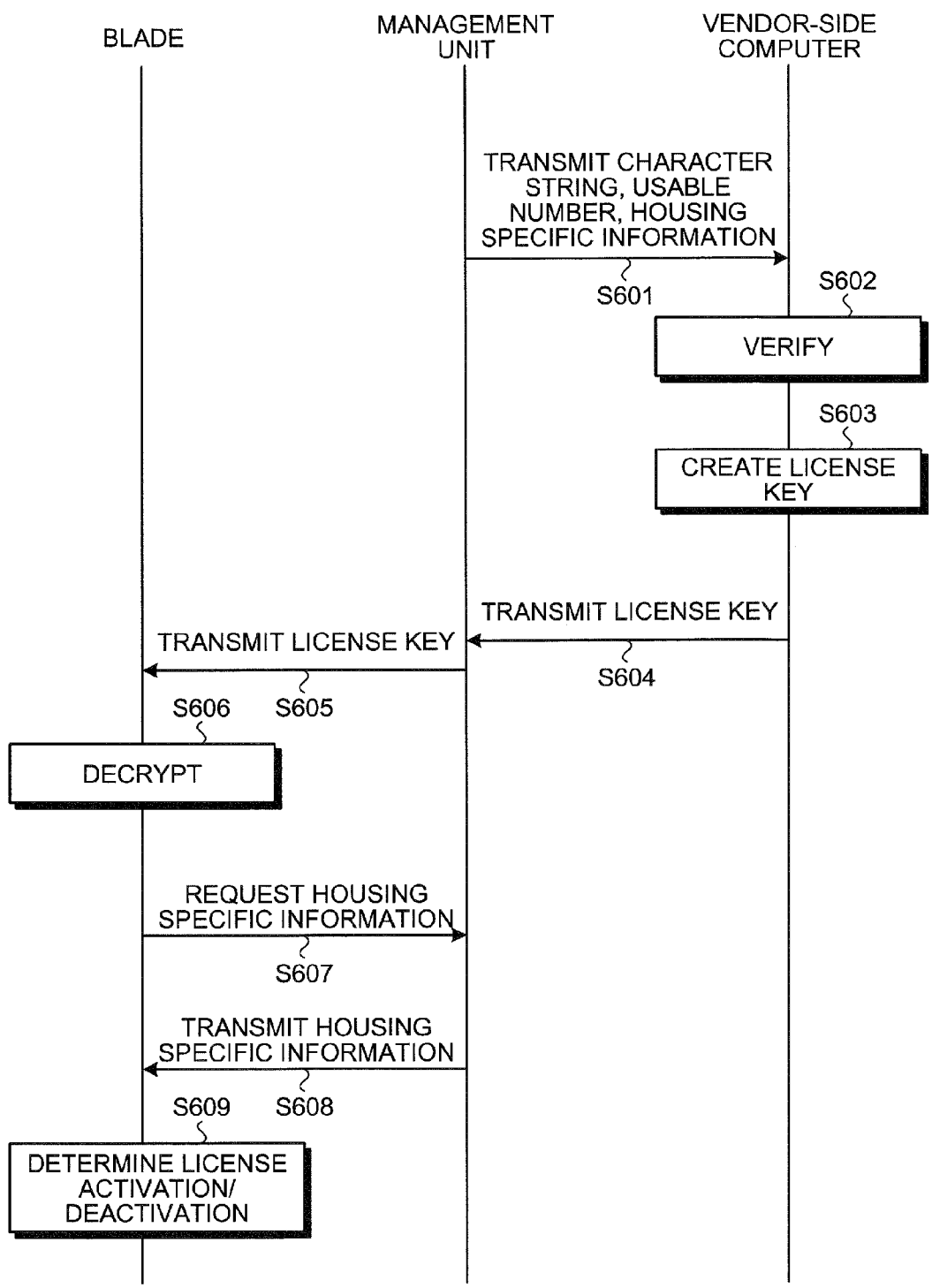
FIG. 6 is a sequence diagram of a flow of the license key acquisition.

FIG. 6 is a sequence diagram of a flow of the license key acquisition. First, the management unit 202 transmits the character string and the usable number described in the optional function purchase certificate and the housing specific information equipped with the blade 201 using the optional function to a vendor-side computer (step S601).

The vendor-side computer verifies whether the received character string is an unused character string (step S602) and, if it is verified that the character string is an unused character string, the vendor-side computer encrypts the received character string, the usable number, and the housing specific information to create a license key (step S603). The vendor-side computer transmits the created license key to the management unit 202 (step S604).

The management unit 202 transmits the received license key to all the blades in the housing 200 (step S605). The blades receiving the license key decrypt the license key (step S606). The blades request the housing specific information to the management unit 202 (step S607). The management unit 202 receiving the request transmits the housing specific information to the blades (step S608).

The blades confirm whether the housing specific information received from the management unit 202 is identical to the housing specific information decrypted from the license key and confirms whether the usage number is within a limit of the usable number decrypted from the license key to judge the validity/invalidity of the license (step S609).

For example, if the housing specific information received from the management unit 202 is identical to the housing specific information decrypted from the license key, it can be judged that the license is authorized and the blade 201 can freely activate the license within a limit of the usable number. On the other hand, if the received housing specific information is not identical to the housing specific information decrypted from the license key, it is determined that the license key is unauthorized and the blade 201 cannot activate the license. If the usage number exceeds the usable number, the blade 201 cannot activate the license. In this way, the blade 201 can acquire the license key including the housing specific information and the usable number to judge the validity/invalidity of the license.

Details of this license activation judgment process (steps S606 to S609) will be described later in the first embodiment with reference to FIGS. 8 and 9. Details of this license activation judgment process (steps S606 to S609) will be described later in the second embodiment with reference to FIGS. 19 and 20.

A specific example of setting the order of activation of licensing by blades will be described. In this example, a customer preliminarily sets priority indicative of which of the blades 201 preferentially activates licensing. Therefore, when operation is changed due to failure or replacement of the blade 201, the blades automatically transfer the license according to the priorities set in the blades, thereby ensuring smooth operation.

The first embodiment is an embodiment in which the blade 201 having higher priority preferentially executes the license activation judgment process while other blades wait for completion of the license activation judgment process by the blade 201 having higher priority. As a result, the license can be activated in order from the blade 201 having the highest priority within a limit of usable number in the housing 200.

A functional configuration of the license management apparatus according to the first embodiment will be described with reference to FIG. 7. Functions of the license management apparatus are implemented by the CPU 301 in the blade 201 in this embodiment. Although license of an optional function of software is activated in the following description, license of the function of the software itself may be activated.

Figure 7:
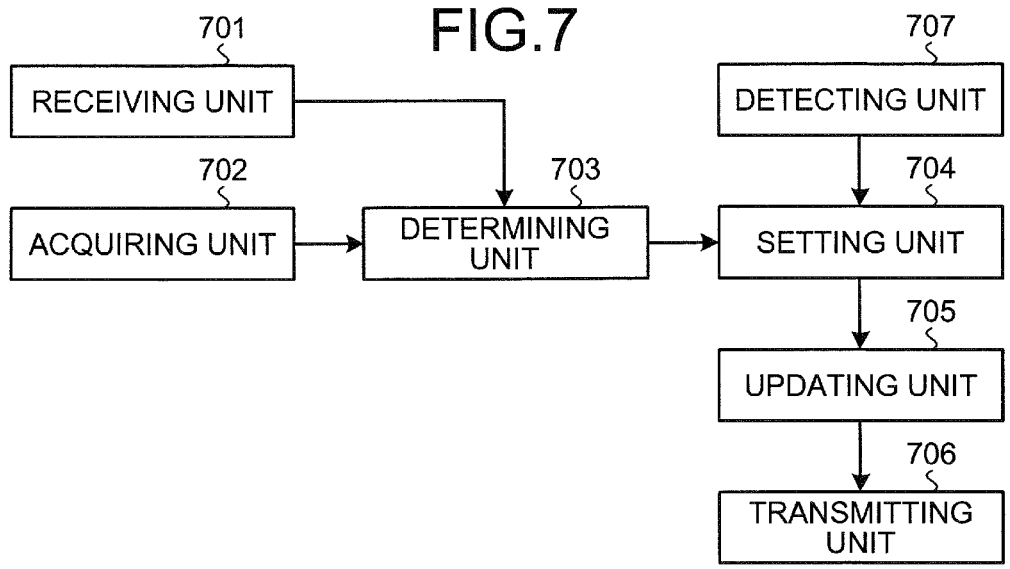
FIG. 7 is a functional block diagram of the license management apparatus according to a first embodiment.

FIG. 7 is a functional block diagram of the license management apparatus according to the first embodiment. As depicted in FIG. 7, the license management apparatus includes a receiving unit 701, an acquiring unit 702, a determining unit 703, a setting unit 704, an updating unit 705, a transmitting unit 706, and a detecting unit 707.

The receiving unit 701 has a function of receiving a first license number indicative of the number of licenses that can use a function of software and identification information specific to the housing 200. The function of the software refers to the optional function described above. The first license number refers to the usable number described above. In other words, the first license number is the number of licenses that can concurrently use the optional function of the software. The identification information specific to the housing 200 refers to the housing specific information described above. For example, the identification information is a serial number of the housing 200.

For example, the receiving unit 701 receives the usable number and the housing specific information from another blade. The receiving unit 701 retains the acquired usable number and the housing specific information in a management table 302*a*. The function of the receiving unit 701 is implemented by causing the CPU 301 to execute a program stored in the memory 302 depicted in FIG. 3, for example.

This enables the receiving unit 701 to receive the usable number and the housing specific information from an external device. The receiving unit 701 may receive the usable number and the housing specific information from the management unit 202. The receiving unit 701 indirectly receives the usable number and the housing specific information by receiving the license key including the usable number and the housing specific information.

The acquiring unit 702 has a function of acquiring identification information specific to the housing 200 from the housing 200. For example, the acquiring unit 702 acquires the housing specific information from the housing 200 and retains the housing specific information in the management table 302*a*. The housing specific information acquired from the housing 200 is used for authentication of the housing specific information acquired from the license key.

The function of the acquiring unit 702 is implemented by causing the CPU 301 to execute a program stored in the memory 302 depicted in FIG. 3, for example. This enables the acquiring unit 702 to acquire the housing specific information.

The determining unit 703 has a function of comparing the received first license number with a second license number used by the blades in the housing 200 to determine whether the function of the software is usable. The determining unit 703 also has a function of determining whether the identification information specific to the housing 200 acquired by the acquiring unit 702 is identical to the identification information specific to the housing 200 received by the receiving unit 701. The second license number is the usage number described above. In other words, the second license number is the number of licenses concurrently using the optional function of the software.

Therefore, the determining unit 703 compares the usable number with the usage number. If the usage number is equal to or greater than the usable number, the determining unit 703 determines that the optional function is unusable. This enables the determining unit 703 to prevent the optional function from being used to the number exceeding the usable number. If the usage number is smaller than the usable number, the determining unit 703 determines that the optional function is usable. This enables the determining unit 703 to determine that the optional function can be used within a limit of the usable number.

Before the comparison between the usable number and the usage number, the determining unit 703 determines whether the housing specific information acquired by the acquiring unit 702 is identical to the housing specific information received by the receiving unit 701. If identical, the determining unit 703 determines that the license is authorized. This enables the determining unit 703 to determine whether the license is licensing legitimately given from the vendor. Therefore, the optional function can be prevented from being used without authorization by using unauthorized licensing. If not identical, the usable number is not compared with the usage number.

The determining unit 703 determines the validity of the license by using the housing specific information common to all the blades 201, instead of specific information of each of the blades 201. Therefore, any of the blades 201 in the housing 200 can determine whether the optional function is usable. If the blade 201 is removed from the housing 200, usage of the optional function can be disabled.

The function of the determining unit 703 is implemented by causing the CPU 301 to execute a program stored in the memory 302 depicted in FIG. 3, for example.

The setting unit 704 has a function of setting a state in which the function of the software is executable if the determining unit 703 determines that the function of the software is usable. The setting unit 704 has a function of setting a state in which the function of the software cannot be executed if the detecting unit 707 detects a failure in the blade thereof without determination being performed by the determining unit 703. For example, the setting unit 704 activates the license to set the state in which the optional function is usable. Alternatively, the setting unit 704 deactivates the license to set the state in which the optional function is unusable.

The function of the setting unit 704 is implemented by causing the CPU 301 to execute a program stored in the memory 302 depicted in FIG. 3, for example. This enables the setting unit 704 to set the blade 201 to the state in which the optional function is usable, or to set the blade 201 to the state in which the optional function is unusable.

The updating unit 705 has a function of updating the second license number. For example, if the setting unit 704 sets the state in which the optional function is usable, the updating unit 705 increments and retains the usage number in the management table 302*a*.

The function of the updating unit 705 is implemented by causing the CPU 301 to execute a program stored in the memory 302 depicted in FIG. 3, for example. This enables the updating unit 705 to update the usage number with the latest information.

The transmitting unit 706 has a function of transmitting the first license number and the second license number updated by the updating unit 705. For example, the transmitting unit 706 transmits the first license number in response to a transmission request from the blade 201 not yet receiving the first license number. The transmitting unit 706 transmits the usage number updated by the updating unit 705 to another blade. Another blade updates the usage number retained in the management table 302a with the latest information.

The function of the transmitting unit 706 is implemented by causing the CPU 301 to execute a program stored in the memory 302 depicted in FIG. 3, for example. This enables the transmitting unit 706 to transmit the usable number to the blade 201 not yet receiving the usable number. This also enables another blade to update the usage number retained in the management table 302a with the latest information.

The transmitting unit 706 may transmit the usable number and the usage number updated by the updating unit 705 to all the blades. The transmitting unit 706 may be configured to transmit the usable number and the usage number updated by the updating unit 705 only to the blade 201 having the next priority to the blade thereof.

The detecting unit 707 has a function of detecting a failure of the blade thereof. For example, the detecting unit 707 detects a failure of the blade thereof and sets the failure bit retained in the management table 302a to one. Although not described in detail because this is a well-known technique, a failure is detected by periodically executing a self-diagnostic program for the memory 302, a signal processing device, and a substrate within the blade 201, for example It is confirmed whether the units normally operate and if a unit does not normally operate, it is determined that the unit has failed.

The function of the detecting unit 707 is implemented by causing the CPU 301 to execute a program stored in the memory 302 depicted in FIG. 3, for example. This enables the detecting unit 707 to detect a failure of the blade.

Figure 8:
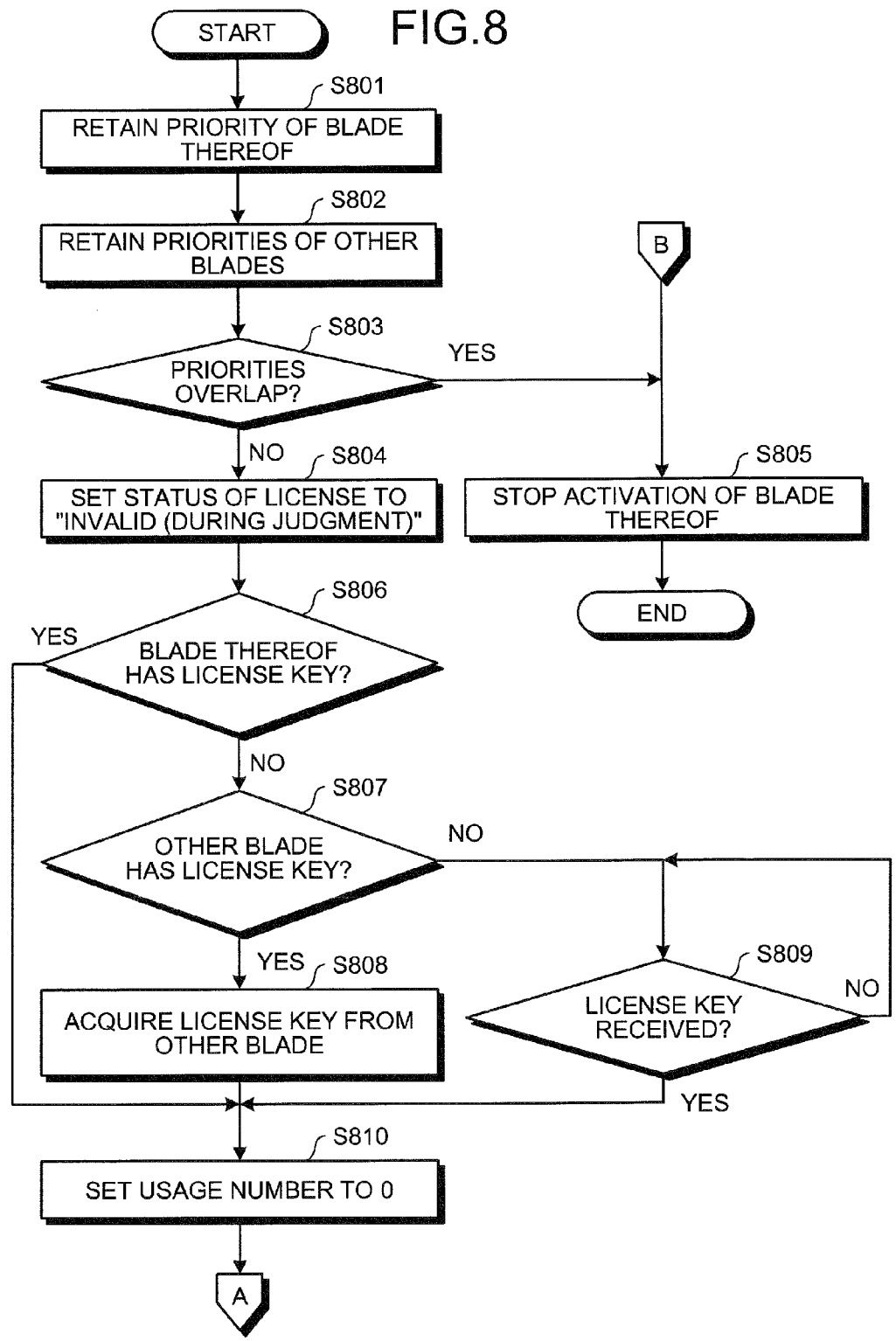
FIG. 8 is a flowchart (part 1) of details of a license activation judgment process using priority according to the first embodiment.

FIG. 8 is a flowchart (part 1) of details of the license activation judgment process (steps S606 to S609 of FIG. 6) using the priority according to the first embodiment. In this flowchart, it is assumed that the all the blades start the license activation judgment process at the same time when the blade 201 is powered on. Each of the blades has priority set by the priority setting SW 304. The priority may be retained in a non-volatile memory.

First, the blade 201 acquires the priority thereof set by the priority setting SW 304 and retains the priority in the management table 302a (step S801). The blade 201 acquires the priorities of the other blades retained in the management tables 302a of the other blades and retains the priorities in the memory 302 (step S802).

The blade 201 determines whether the priority of another blade overlaps with the priority of the blade 201 (step S803). If the priority of another blade overlaps with the priority of the blade 201 (step S803: YES), the blade 201 stops the activation of the blade 201 because of improper priority setting (step S805) and terminates the license activation judgment process.

On the other hand, if the priority of another blade does not overlap with the priority of the blade 201 (step S803: NO), the process goes to step S804.

The blade 201 sets the status of the license of the blade 201 to "invalid (during judgment)" (step S804). However, if the license of the blade 201 is activated before entering the license activation judgment process, the status of the license of the blade 201 is set to "valid (during judgment)".

The blade 201 determines whether the license key is retained in the management table 302a thereof (step S806). If the license key is retained in the management table 302a of the blade 201 (step S806: YES), the process goes to step S810.

If the license key is not retained in the management table 302a of the blade 201 (step S806: NO), the blade 201 determines whether the license key is retained in the management table 302a of another blade (step S807). If the license key is retained in the management table 302a of another blade (step S807: YES), the blade 201 acquires the license key from the management table 302a of another blade (step S808) and retains the acquired license key in the management table 302a of the blade 201 and the process goes to step S810.

If the license key is not retained in the management table 302a of another blade (step S807: NO), the blade 201 determines whether the license key is received from the management unit (step S809). If the license key is not received (step S809: NO), the process returns to step S809. If the license key is received (step S809: YES), the process goes to step S810.

Figure 9:
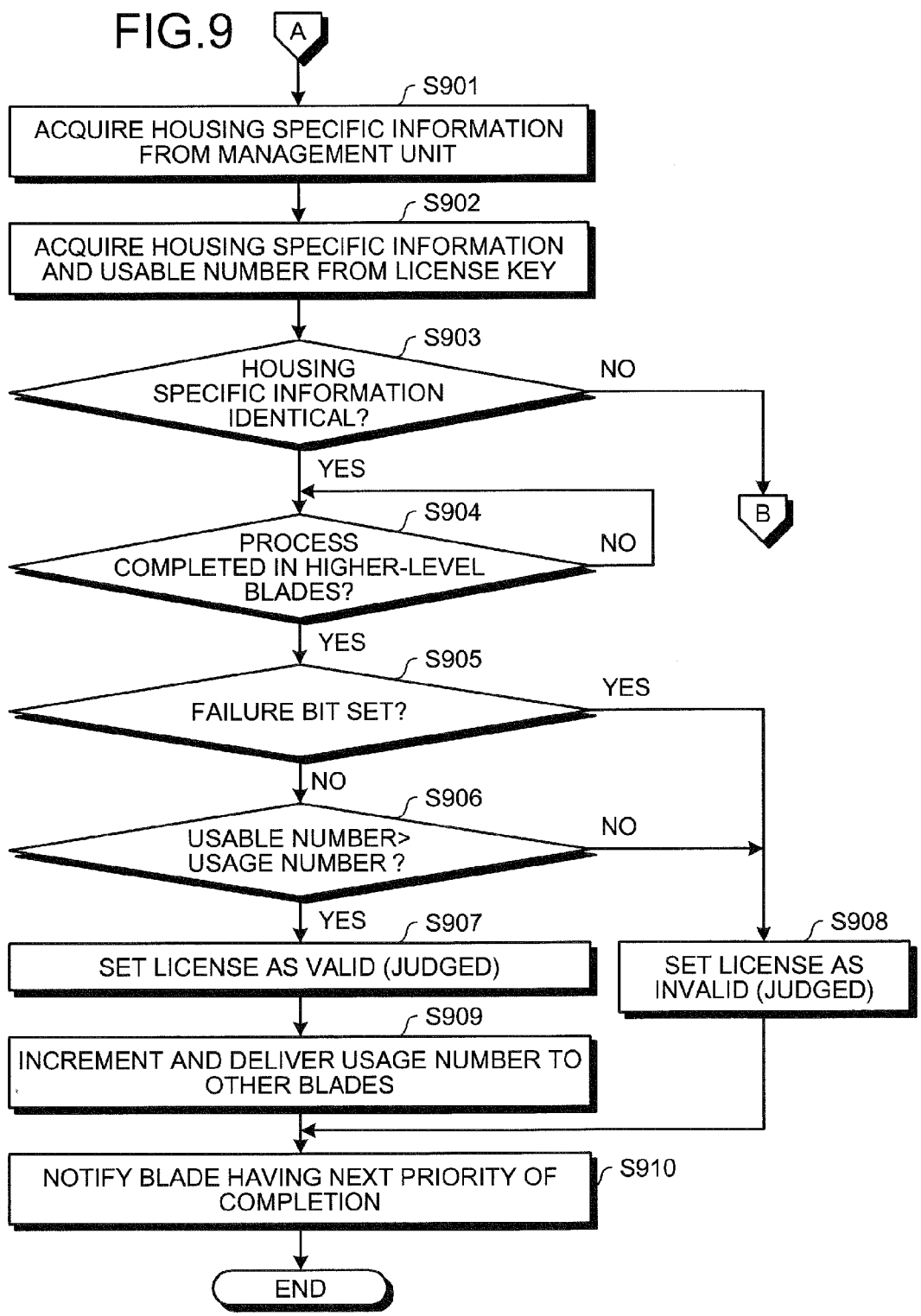
FIG. 9 is a flowchart (part 2) of details of the license activation judgment process using the priority according to the first embodiment.

Since all the blades start the license activation judgment process and none of the blades 201 has activated licensing at this point, the blade 201 sets a value of the usage number retained in the management table 302a to zero (step S810) and the process goes to step S901 of FIG. 9.

FIG. 9 is a flowchart (part 2) of details of the license activation judgment process (steps S606 to S609 of FIG. 6) using the priority according to the first embodiment. In FIG. 9, the blade 201 acquires the housing specific information from the management unit 202 (step S901) and retains the housing specific information in the management table 302a. The blade 201 decrypts the license key to acquire the housing specific information and the usable number (step S902) and retains the housing specific information and the usable number in the management table 302a.

The blade 201 determines whether the decrypted housing specific information is identical to the acquired housing specific information (step S903). If the decrypted housing specific information is not identical to the acquired housing specific information (step S903: NO), the license is considered as an authorized license and the blade 201 stops the activation of the blade 201 (step S805) and terminates the license activation judgment process. If the decrypted housing specific information is identical to the acquired housing specific information (step S903: YES), the license is considered as an authorized license and the process goes to step S904.

The blade 201 determines whether the license activation judgment process is completed at the blades 201 having priority higher than the priority thereof (hereinafter referred to as higher-level blades) (step S904). If the license activation judgment process is not completed in the higher-level blades (step S904: NO), the process returns to step S904. If the license activation judgment process is completed in the higher-level blades (step S904: YES), the blade 201 receives the usage number from the higher-level blades and the process goes to step S905.

The blade 201 determines whether the failure bit thereof is set (step S905). If the failure bit of the blade 201 is set (step S905: YES), the blade 201 considers that the blade 201 is in failure, and sets the license as invalid (judged) (step S908) and the process goes to step S910. If the failure bit of the blade 201 is not set (step S905: NO), the blade 201 considers that the blade 201 is in the normal operation state and the process goes to step S906.

The blade 201 determines whether the usable number>the usage number is satisfied (step S906). If the usable number>the usage number is not satisfied (step S906: NO), the blade 201 considers that no unused license exists, and sets the license as invalid (judged) (step S908) and the process goes to step S910. If the usable number>the usage number is satisfied (step S906: YES), the blade 201 considers that an unused license exists, and sets the license as valid (judged) (step S907), increments and retains the usage number in the management table 302a, and delivers the incremented usage number to the other blades (step S909). The process goes to step S910.

Lastly, the blade 201 refers to the priorities of the other blades retained in the memory 302 and notifies the next priority blade 201 of the completion of the license activation judgment process thereof (step S910). If the next priority blade 201 does not exist, the notification of the completion of the license activation judgment process is not made. The blade 201 terminates the license activation judgment process and shifts to the normal operation state. The license activation judgment process enables the blade 201 to activate the license within a limit of the usable number.

Although the license activation judgment process is executed when the blade 201 is powered on for the first time, the execution of this process may be triggered by addition/replacement of the blade 201 and the execution of the license activation judgment process may be triggered when a failure is detected. In this case, if all the blades are configured to execute the license activation judgment process, the usage number is set to "0" in all the blades at step S810.

Configuration may be such that the license activation judgment process is executed only by the added/replaced blade 201 and the blades 201 having priority lower than the added/replaced blade 201. In this case, at step S810, the usage number is set to the number of the blades 201 activating the license of the software or the optional function of the software among the blades 201 not executing the license activation judgment process. The process of step S904 may be omitted in the added/replaced blade 201. The license activation judgment process may be repeatedly executed at regular time intervals for prevention of unauthorized use.

Although each blade transmits the incremented usage number to all the blades in this flowchart, configuration may be such that the incremented usage number is transmitted only to the blade 201 having the priority next to the blade. Although only the blade 201 having the priority next to the blade is notified of the completion of the license activation judgment process of the blade, all the blades may be notified of the completion of the license activation judgment process of the blade so that each of the blades determines whether the license activation judgment process is started.

As described above, the license can be activated in order from the blade 201 having the highest priority within a limit of the usable number. The license can automatically be activated/deactivated according to the priority at the time of replacement/addition/failure of the blade 201.

A process in the case of a failure of the blade 201 occurring after shift to the normal operation state will be described.

Figure 10:
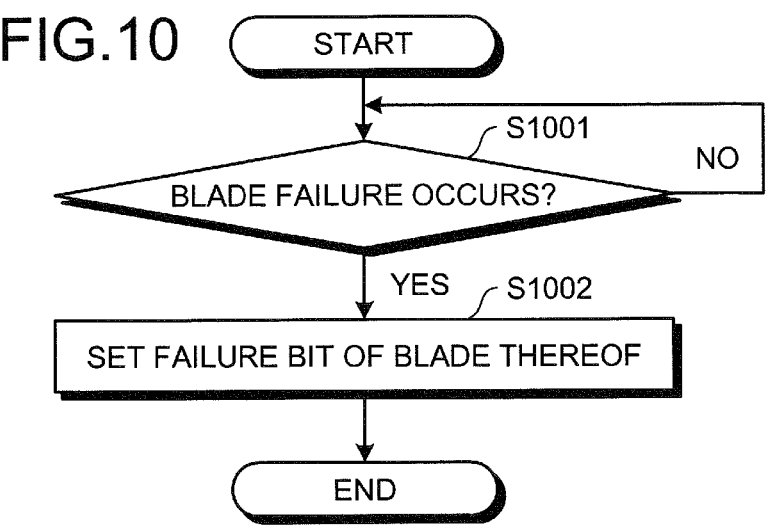
FIG. 10 is a flowchart of a flow of failure detection.

FIG. 10 is a flowchart of a flow of failure detection. First, the blade 201 determines whether a failure occurs in the blade 201 (step S1001). If no failure occurs in the blade 201 (step S1001: NO), the process returns to step S1001.

If a failure occurs in the blade 201 (step S1001: YES), the blade 201 sets the failure bit of the management table 302a thereof (step S1002). The blade 201 terminates the process of failure detection. This process enables the blade 201 to detect a failure thereof.

Failure detection may trigger execution of the license activation judgment process in all the blades. For example, the failed blade 201 notifies the other blades of failure detection so that the failed blade 201 and the notified blades 201 execute the license activation judgment process. In this case, only the failed blade 201 and the blades 201 having priority lower than the failed blade 201 may execute the license activation judgment process. This eliminates a burden due to the license activation judgment process in the higher-level blades of the failed blade 201.

When a failure is detected, announcement of occurrence of the failure may be displayed on a display (not depicted) to notify a user of the necessity of replacement of the blade 201. Middleware may be used for setting a switching destination of the blade 201 at the time of occurrence of a failure such that only the two blades 201 of the switching source and the switching destination execute the license activation judgment process.

If the blade 201 once executing the license activation judgment process executes the license activation judgment process again, the management table 302a of the blade 201 already retains the priority and the license key. Therefore, the blade 201 may start the license activation judgment process from step S808 of FIG. 8. This accelerates the license activation judgment process. A specific example of the first embodiment will be described with reference to FIGS. 11 to 17.

FIGS. 11, 12, 13, 14, 15, 16, and 17 are explanatory views of a specific example of the first embodiment. In FIG. 11, it is assumed that a blade 1 is inserted into the housing 200. The blade 1 retains the priority thereof set by the priority setting SW 304 in the management table 302a (1). In the case depicted in FIG. 11, no other blade exists (2) and, therefore, the blade 1 continues the process without acquiring the priority from another blade.

Since the license key is not retained in the management table 302a of the blade 1 (3), the blade 1 attempts to acquire the license key from another blade. However, no other blade exists in the housing 200 and the blade 1 cannot acquire the license key from another blade (4). Therefore, the blade 1 waits until the license key is input from the management unit 202 (5).

It is assumed that the license key is input from the management unit 202 to the blade 1. The blade 1 sets the usage number to zero and retains the usage number in the management table 302a (6).

In FIG. 12, the blade 1 receives the housing specific information from the management unit 202 (7). The blade 1 decrypts the license key to acquire the housing specific information and the usable number. Since the received housing specific information is identical to the decrypted housing specific information (8), the blade 1 determines that the license key is authorized, and goes to the next process.

The blade 1 compares the usable number with the usage number. Since the usable number is two and the usage number is zero (9), the blade 1 determines that the license can still be activated. The blade 1 activates the license (10). The blade 1 increments and retains the usage number in the management table 302a. The blade 1 does not make a notification of completion of the process of the blade 1 since no other blade exists in the housing 200.

It is assumed that a new blade 2 is inserted into the housing 200. In this example, it is assumed that all the blades execute the license activation judgment process in association with the addition of the blade 201.

Each blade retains priority set by the priority setting SW 304 in the management table 302a (11). Each blade acquires and retains the priority from the other blade into the memory 302 (12).

Since the license key is not retained in the management table 302a of the blade 2 (13), the blade 2 attempts to acquire the license key from the other blade (in this case, the blade 1)

(14). The blades 2 receives and retains the license key from the blade 1 into the management table 302a (15). Each blade sets the usage number to zero and retains the usage number in the management table 302a (16).

Figure 13:
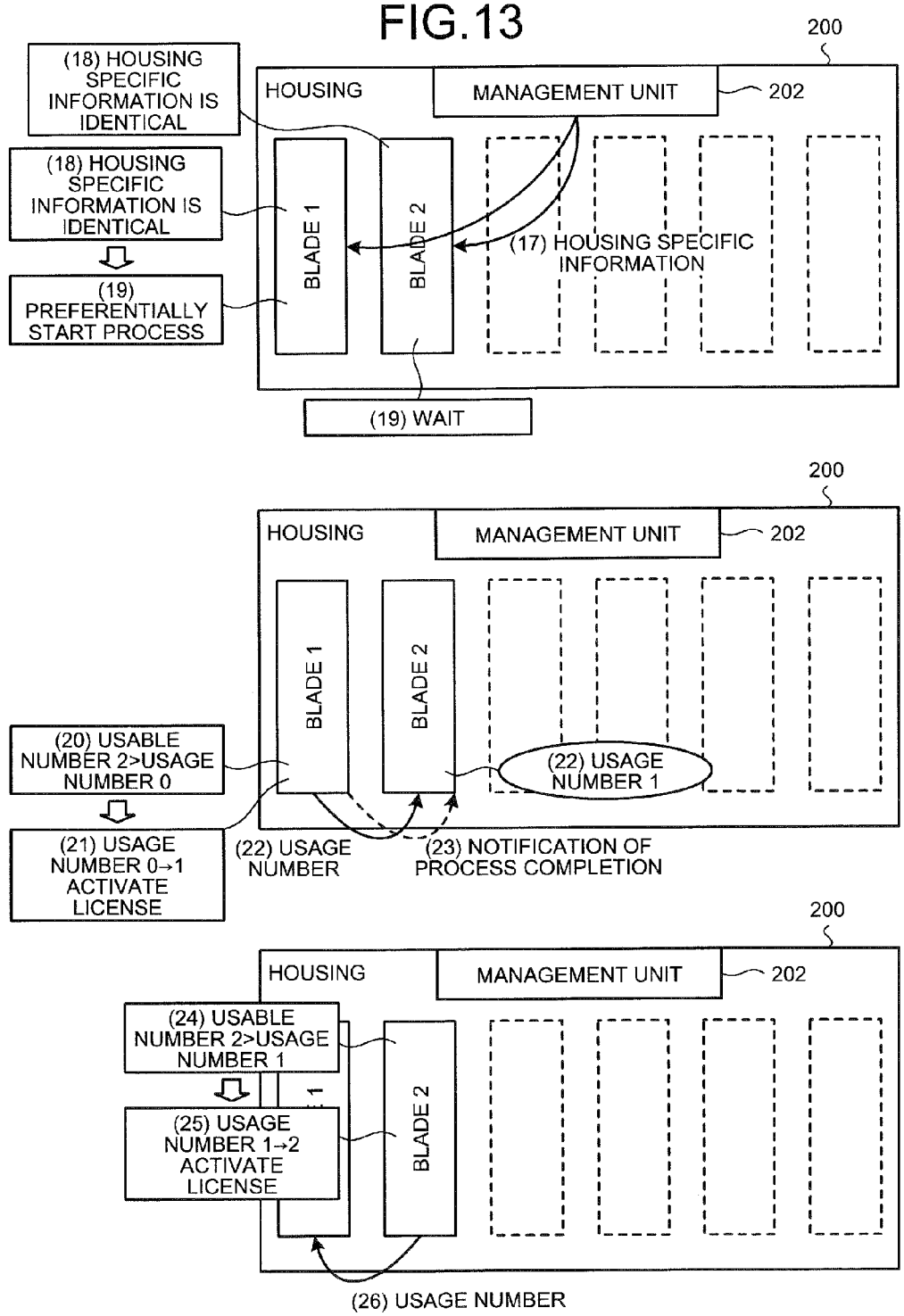

In FIG. 13, each blade receives the housing specific information from the management unit 202 (17). Each blade decrypts the license key to acquire the housing specific information and the usable number. Since the received housing specific information is identical to the decrypted housing specific information (18), each blade determines that the license key is authorized, and goes to the next process.

Each blade determines which blade 201 is the higher-level blade based on the priority thereof retained in the management table 302a and the priority of the other blade retained in the memory 302. Each blade waits for completion of the process of the higher-level blade (19). Since the blade 1 has the highest priority and has no higher-level blade, the blade 1 starts the process. The blade 2 waits for completion of the process of the blade 1.

The blade 1 compares the usable number with the usage number. Since the usable number is two and the usage number is zero (20), the blade 1 determines that the license can still be activated. The blade 1 activates the license (21). The blade 1 increments and retains the usage number in the management table 302a.

The blade 1 transmits the incremented usage number to the other blade (22). The blade 2 retains the usage number received from the blade 1 in the management table 302a. The blade 1 notifies the blade 2 of the completion of the process of the blade 1 (23).

The blade 2 is notified of the completion of the process of the blade 1 and starts the process. The blade 2 compares the usable number with the usage number. Since the usable number is two and the usage number is one (24), the blade 2 determines that the license can still be activated. The blade 2 activates the license (25). The blade 2 increments and retains the usage number in the management table 302a.

The blade 2 transmits the incremented usage number to the other blade (26). The blade 1 retains the usage number received from the blade 2 in the management table 302a. Since a blade having priority lower than the blade 2 (hereinafter referred to as a "lower-level blade") does not exist in the example of FIG. 12, the blade 2 does not notify another blade of the compression of the process of the blade 2.

It is assumed that a new blade 3 is inserted into the housing 200. In this example, it is assumed that all the blades execute the license activation judgment process in association with the addition of the blade 201.

In FIG. 14, each blade retains priority set by the priority setting SW 304 in the management table 302a (27). Each blade acquires and retains the priorities from the other blades into the memory 302 (28).

Since the license key is not retained in the management table 302a of the blade 3 (29), the blade 3 attempts to acquire the license key from another blade (in this case, the blade 1) (30). The blades 3 receives and retains the license key from the blade 1 into the management table 302a (31). Each blade sets the usage number to zero and retains the usage number in the management table 302a (32).

Each blade receives the housing specific information from the management unit 202 (33). Each blade decrypts the license key to acquire the housing specific information and the usable number. Since the received housing specific information is identical to the decrypted housing specific information (34), each blade determines that the license key is authorized, and goes to the next process.

Each blade waits for completion of the process of a higher-level blade (35). Since the blade 1 has the highest priority and has no higher-level blade, the blade 1 starts the process. Since the blade 3 has the second-highest priority, the blade 3 waits for completion of the process of the blade 1 and then starts the process. Since the blade 2 has the lowest priority, the blade 2 waits for completion of the process of the blade 3 and lastly starts the process.

Figure 15:
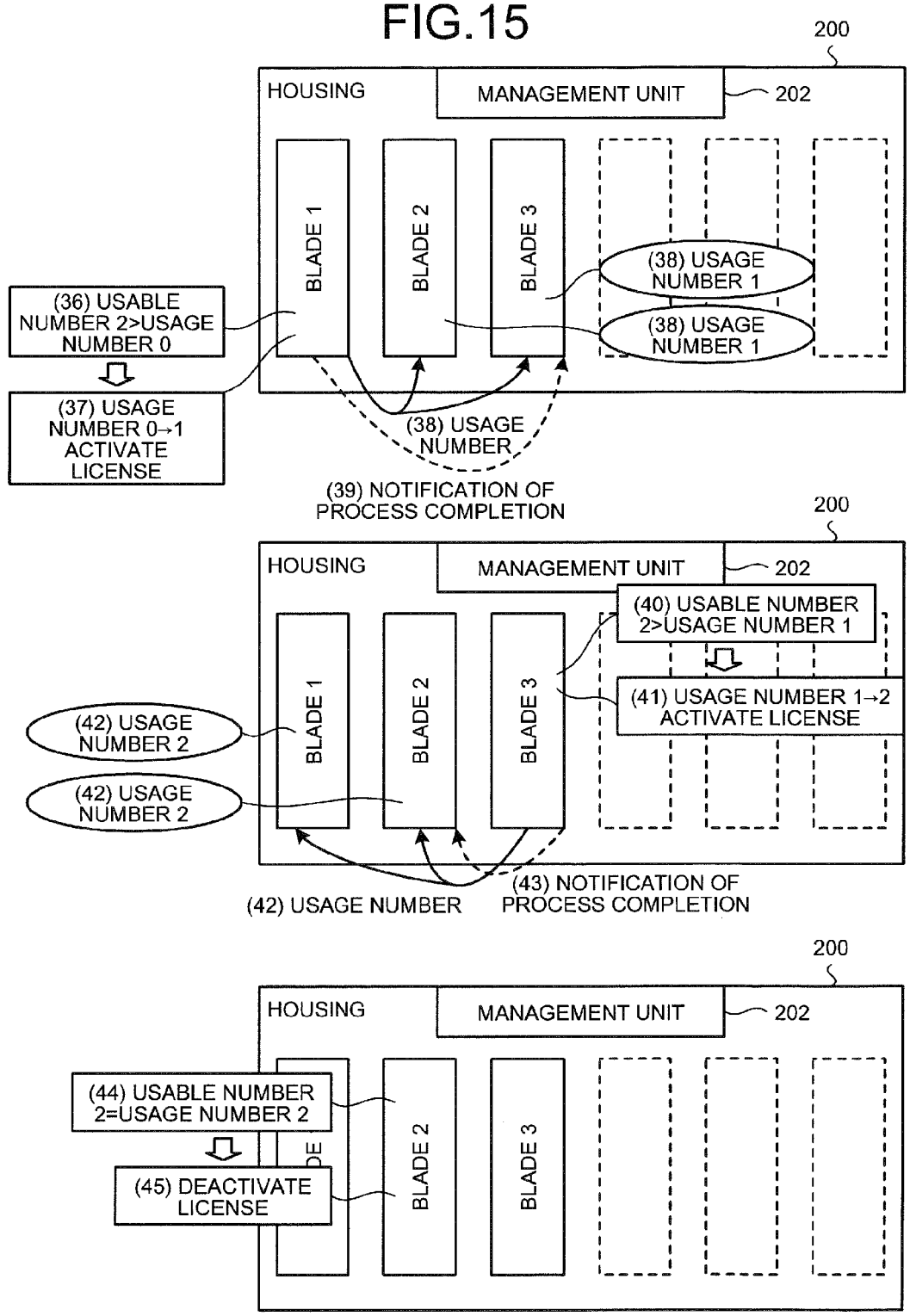

In FIG. 15, the blade 1 compares the usable number with the usage number. Since the usable number is two and the usage number is zero (36), the blade 1 determines that the license can still be activated. The blade 1 activates the license (37). The blade 1 increments and retains the usage number in the management table 302a.

The blade 1 transmits the incremented usage number to the other blades (38). The blades 2 and 3 retain the received usage number in the management tables 302a. The blade 1 notifies the blade 3 of the completion of the process of the blade 1 (39).

The blade 3 is notified and starts the process. The blade 3 compares the usable number with the usage number. Since the usable number is two and the usage number is one (40), the blade 3 determines that the license can still be activated. The blade 3 activates the license (41). The blade 3 increments and retains the usage number in the management table 302a.

The blade 3 transmits the incremented usage number to the other blades (42). The blades 1 and 2 retain the received usage number in the management table 302a. The blade 3 notifies the blade 2 of the completion of the process of the blade 3 (43).

The blade 2 is notified and starts the process. The blade 2 compares the usable number with the usage number. Since the usable number is two and the usage number is two (44), the blade 2 determines that the license cannot be activated. The blade 2 deactivates the license (45). Since the blade 2 has no lower-level blade, the blade 2 does not notify another blade of the compression of the process of the blade 2.

A case of a failure occurring in the blade 1 will be described. In this description, it is assumed that all the blades execute the license activation judgment process in association with the occurrence of the failure in the blade 201.

In FIG. 16, when detecting a failure, the blade 1 sets the failure bit to one and retains the failure bit in the management table 302a (46). The blade 1 notifies the other blades of the detection of the failure. The blade 1 detecting the failure and the blades 2 and 3 notified of the detection of the failure start the license activation judgment process.

Each blade retains priority set by the priority setting SW 304 in the management table 302a (47). Each blade acquires and retains the priorities from the other blades into the memory 302 (48). Each blade retains the license key and therefore directly goes to the next process. Each blade sets the usage number to zero and retains the usage number in the management table 302a (49).

Each blade receives the housing specific information from the management unit 202 (50). Each blade decrypts the license key to acquire the housing specific information and the usable number. Since the received housing specific information is identical to the decrypted housing specific information (51), each blade determines that the license key is authorized, and goes to the next process.

Each blade waits for completion of the process of a higher-level blade (52). Since the blade 1 has the highest priority and has no higher-level blade, the blade 1 starts the process. The blade 2 waits for completion of the process of the blade 3 and the blade 3 waits for completion of the process of the blade 1.

Figure 17:
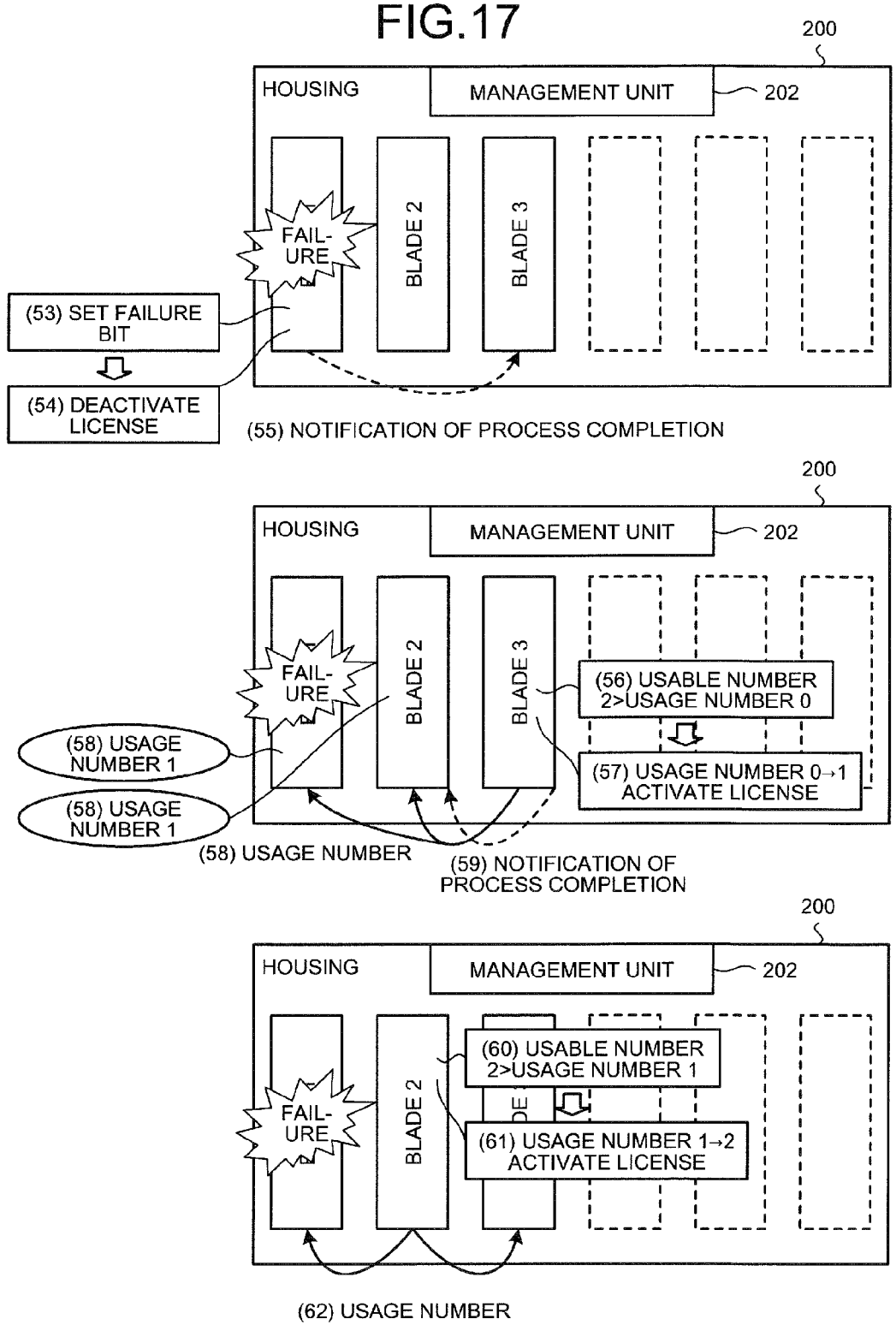

In FIG. 17, since the failure bit is set (53), the blade 1 deactivates the license thereof (54) and notifies the blade 3 of the completion of the process of the blade 1 (55).

The blade 3 is notified and starts the process. The blade 3 compares the usable number with the usage number. Since the usable number is two and the usage number is zero (56), the blade 3 determines that the license can still be activated. The blade 3 activates the license (57). The blade 3 increments and retains the usage number in the management table 302a.

The blade 3 transmits the incremented usage number to the other blades (58). The blades 1 and 2 retain the received usage number in the management table 302a. The blade 3 notifies the blade 2 of the completion of the process of the blade 3 (59).

The blade 2 compares the usable number with the usage number. Since the usable number is two and the usage number is one (60), the blade 2 determines that the license can still be activated. The blade 2 activates the license (61). The blade 2 increments and retains the usage number in the management table 302a.

The blade 2 transmits the incremented usage number to the other blades (62). The blades 1 and 3 retain the received usage number in the management table 302a. Since the blade 2 has no lower-level blade, the blade 2 does not notify another blade of the compression of the process of the blade 2.

As described above, in the first embodiment, the blades mutually monitor the usage number such that the usage number does not exceed the usable number. Therefore, any of the blades 201 can freely activate the license within a limit of the usable number to use the software or the optional function of the software. Since the blades mutually monitor the usage number, it is not necessary to dispose a license management unit externally and costs can be reduced. The mutual monitoring of the usage number by the blades eliminates the risk of unauthorized use of the software or the optional function of the software through improper modification of the license management unit. Since it is not necessary to dispose a license management unit externally, operation can be prevented from stopping due to failure of the license management unit.

Since the blades wait for completion of the license activation judgment process of the higher-level blades, the usage number can be prevented from exceeding the usable number due to malfunction. Since the license key is locked to the housing specific information, the software or the optional function of the software can be prevented from being used without authorization by detaching the blade 201 from the bus 203.

In the first embodiment, if the addition/failure of the blade 201 is detected, the license activation judgment process is executed again to cause the blades 201 to automatically activate/deactivate the license according to the priority. Since the license of the failed blade 201 is deactivated at the same time, prompt maintenance can automatically be performed.

The second embodiment will be described. Although the priority is used in the first embodiment, the priority (comp) is used in the second embodiment. In the second embodiment, the blades 201 capable of activation of licensing are determined and the blades concurrently execute the license activation judgment process. This enables the blades to activate the license within a limit of the usable number in the housing without waiting for the process of the blades 201 having higher priorities.

A functional configuration of the license management apparatus according to the second embodiment will be described with reference to FIG. 18. Functions of the license management apparatus are implemented by the CPU 301 in the blade 201 in this embodiment. Although license of an optional function of software is activated in the following description, license of the function of the software itself may be activated.

Figure 18:
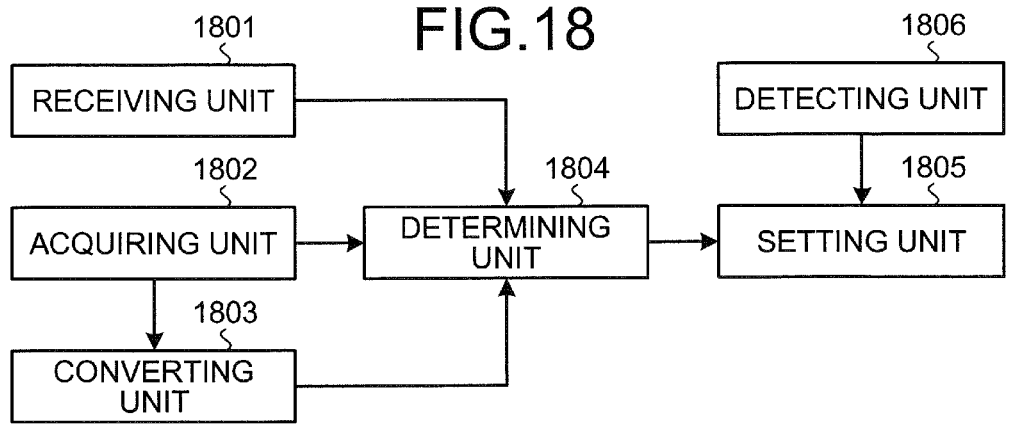
FIG. 18 is a functional block diagram of the license management apparatus according to a second embodiment.

FIG. 18 is a functional block diagram of the license management apparatus according to the second embodiment. As depicted in FIG. 18, the license management apparatus includes a receiving unit 1801, an acquiring unit 1802, a converting unit 1803, a determining unit 1804, a setting unit 1805, and a detecting unit 1806.

The receiving unit 1801 has a function of receiving the number of usable licenses for a function of the software from another blades. The receiving unit 1801 also has a function of receiving identification information specific to the housing 200. The function of the software refers to the optional function described above. The number of usable licenses refers to the usable number described above. In other words, the number of usable licenses is the number of licenses that can concurrently use the optional function of the software on a network. The identification information specific to the housing 200 refers to the housing specific information described above. For example, the identification information is a serial number of the housing 200.

For example, the receiving unit 1801 receives the usable number and the housing specific information from another blade. The receiving unit 1801 retains the acquired usable number and the housing specific information in a management table 302a. The function of the receiving unit 1801 is implemented by causing the CPU 301 to execute a program stored in the memory 302 depicted in FIG. 3, for example.

This enables the receiving unit 1801 to receive the usable number and the housing specific information. The receiving unit 1801 may receive the usable number and the housing specific information from the management unit 202. Actually, the receiving unit 1801 indirectly receives the usable number and the housing specific information by receiving the license key including the usable number and the housing specific information.

The acquiring unit 1802 has a function of acquiring the priorities from the blades. The priority is set by the priority setting SW 304 for each blade. The acquiring unit 1802 has a function of acquiring identification information specific to the housing 200 from the housing 200.

For example, the acquiring unit 1802 acquires and retains the priorities of the blades into the memory 302. For example, the acquiring unit 1802 acquires the housing specific information from the housing 200 and retains the housing specific information in the management table 302a. The function of the acquiring unit 1802 is implemented by causing the CPU 301 to execute a program stored in the memory 302 depicted in FIG. 3, for example. This enables the acquiring unit 1802 to acquire the priorities of the blades. This also enables the acquiring unit 1802 to acquire the housing specific information.

The converting unit 1803 has a function of converting the priority of the blade thereof acquired by the acquiring unit 1802 into a number corresponding to the priority of the blade thereof out of consecutive numbers starting with one. The number corresponding to the priority of the blade thereof out of consecutive numbers starting with one is the priority (comp) described above. For example, if a priority of a smaller number is defined as a higher priority, the converting unit 1803 sorts the priorities of the blades in descending order and retains the rank thereof as the priority (comp) in the management table 302a.

The function of the converting unit 1803 is implemented by causing the CPU 301 to execute a program stored in the memory 302 depicted in FIG. 3, for example. This enables the converting unit 1803 to acquire the priority (comp).

The determining unit 1804 has a function of comparing the license number received by the receiving unit 1801 with the number corresponding to the blade thereof converted by the converting unit 1803 to determine whether the function of the software is usable. The determining unit 1804 also has a function of determining whether the identification information specific to the housing 200 acquired by the acquiring unit 1802 is identical to the identification information specific to the housing 200 received by the receiving unit 1801.

For example, the determining unit 1804 determines that the optional function is usable if the priority (comp) of the blade thereof is equal to or less than the usable number. For example, the determining unit 1804 determines that the license is authorized if the housing specific information acquired by the acquiring unit 1802 is identical to the housing specific information received by the receiving unit 1801.

The function of the determining unit 1804 is implemented by causing the CPU 301 to execute a program stored in the memory 302 depicted in FIG. 3, for example. This enables the determining unit 1804 to prevent the optional function from being used to the number exceeding the usable number. This also enables the determining unit 1804 to determine whether the license is license legitimately given from the vendor.

The setting unit 1805 has a function of setting a state in which the function of the software is executable if the determining unit 1804 determines that the function of the software is usable. The setting unit 1805 has a function of setting a state in which the function of the software cannot be executed if the detecting unit 1804 detects a failure in the blade without determination being performed by the determining unit 1804. For example, the setting unit 1805 activates the license to set the state in which the optional function is usable. Alternatively, the setting unit 1805 deactivates the license to set the state in which the optional function is unusable.

The function of the setting unit 1805 is implemented by causing the CPU 301 to execute a program stored in the memory 302 depicted in FIG. 3, for example. This enables the setting unit 1805 to set the blade 201 to the state in which the optional function is usable, or to set the blade 201 to the state in which the optional function is unusable.

The detecting unit 1806 has a function of detecting a failure of the blade thereof. For example, the detecting unit 1806 detects a failure of the blade thereof and sets the failure bit retained in the management table 302a to one.

The function of the detecting unit 1806 is implemented by causing the CPU 301 to execute a program stored in the memory 302 depicted in FIG. 3, for example. This enables the detecting unit 1806 to detect a failure of the blade.

Figure 19:
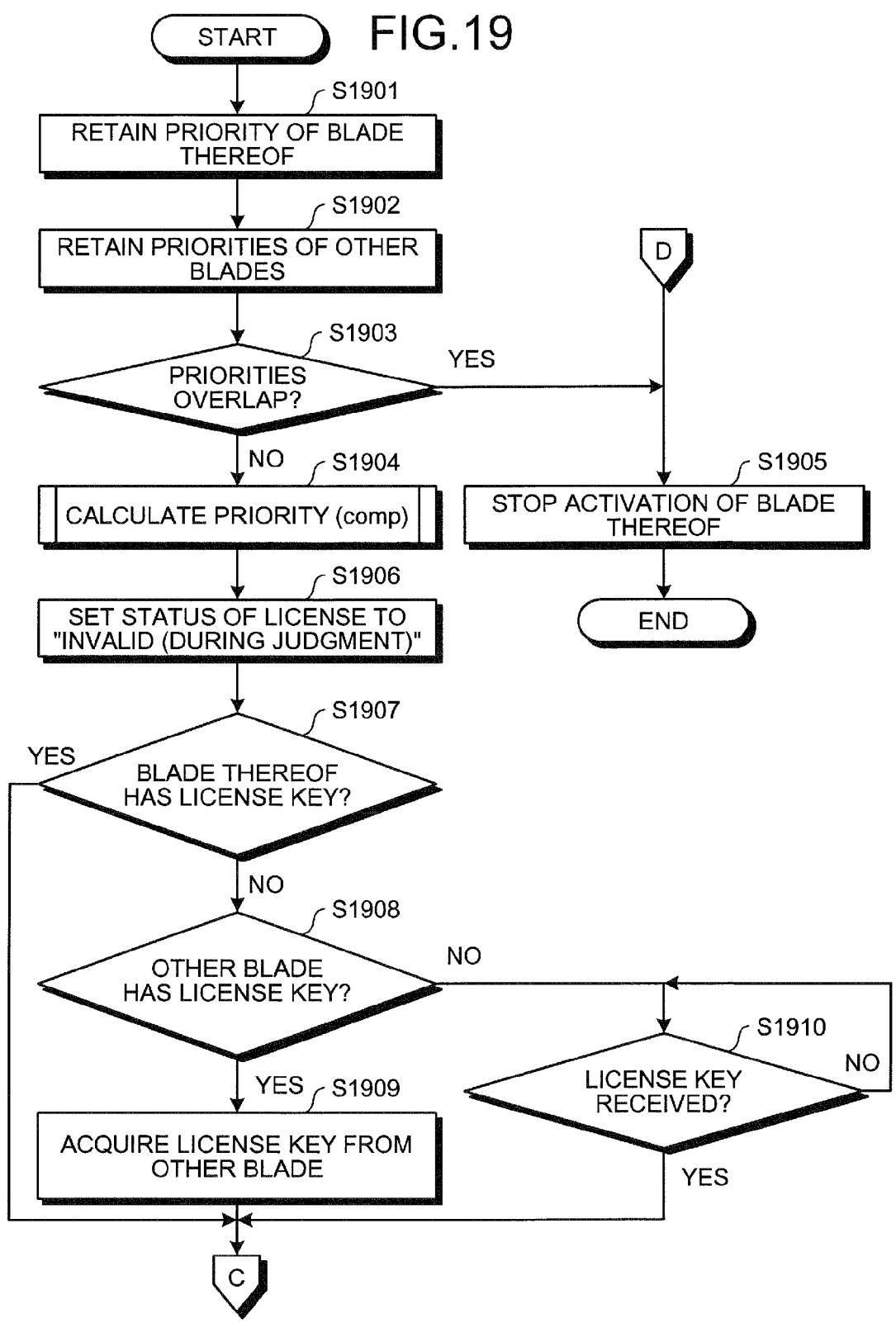
FIG. 19 is a flowchart (part 1) of details of the license activation using priority (comp) according to the second embodiment.

FIG. 19 is a flowchart (part 1) of details of the license activation (steps S606 to S609 of FIG. 6) using the priority (comp) according to the second embodiment. Each of the blades has priority set by the priority setting SW 304.

First, the blade 201 acquires the priority thereof set by the priority setting SW 304 and retains the priority in the management table 302a (step S1901). The blade 201 acquires the priorities of the other blades retained in the management tables 302a of the other blades and retains the priorities in the memory 302 (step S1902).

The blade 201 determines whether the priority of another blade overlaps with the priority of the blade 201 (step S1903). If the priority of another blade overlaps with the priority of the blade 201 (step S1903: YES), the blade 201 stops the activation of the blade 201 because of improper priority setting (step S1905) and terminates the license activation judgment process.

If the priority of another blade does not overlap with the priority of the blade (step S1903: NO), the blade 201 calculates the priority (comp) (step S1904). Step S1904 will be described later in FIG. 21.

The blade 201 sets the status of the license of the blade 201 to "invalid (during judgment)" (step S1906). However, if the license of the blade 201 is activated before entering the license activation judgment process, the status of the license of the blade 201 is set to "valid (during judgment)".

The blade 201 determines whether the license key is retained in the management table 302a thereof (step S1907). If the license key is retained in the management table 302a of the blade 201 (step S1907: YES), the process goes to step S2000 depicted in FIG. 20.

If the license key is not retained in the management table 302a of the blade 201 (step S1907: NO), the blade 201 determines whether the license key is retained in the management table 302a of another blade (step S1908). If the license key is retained in the management table 302a of another blade (step S1908: YES), the blade 201 acquires the license key from the management table 302a of another blade (step S1909) and retains the acquired license key in the management table 302a of the blade 201 and the process goes to step S2001 depicted in FIG. 20.

If the license key is not retained in the management table 302a of another blade (step S1908: NO), the blade 201 determines whether the license key is received (step S1910). If the license key is not received (step S1910: NO), the process returns to step S1910. If the license key is received (step S1910: YES), the process goes to step S2001 depicted in FIG. 20.

Figure 20:
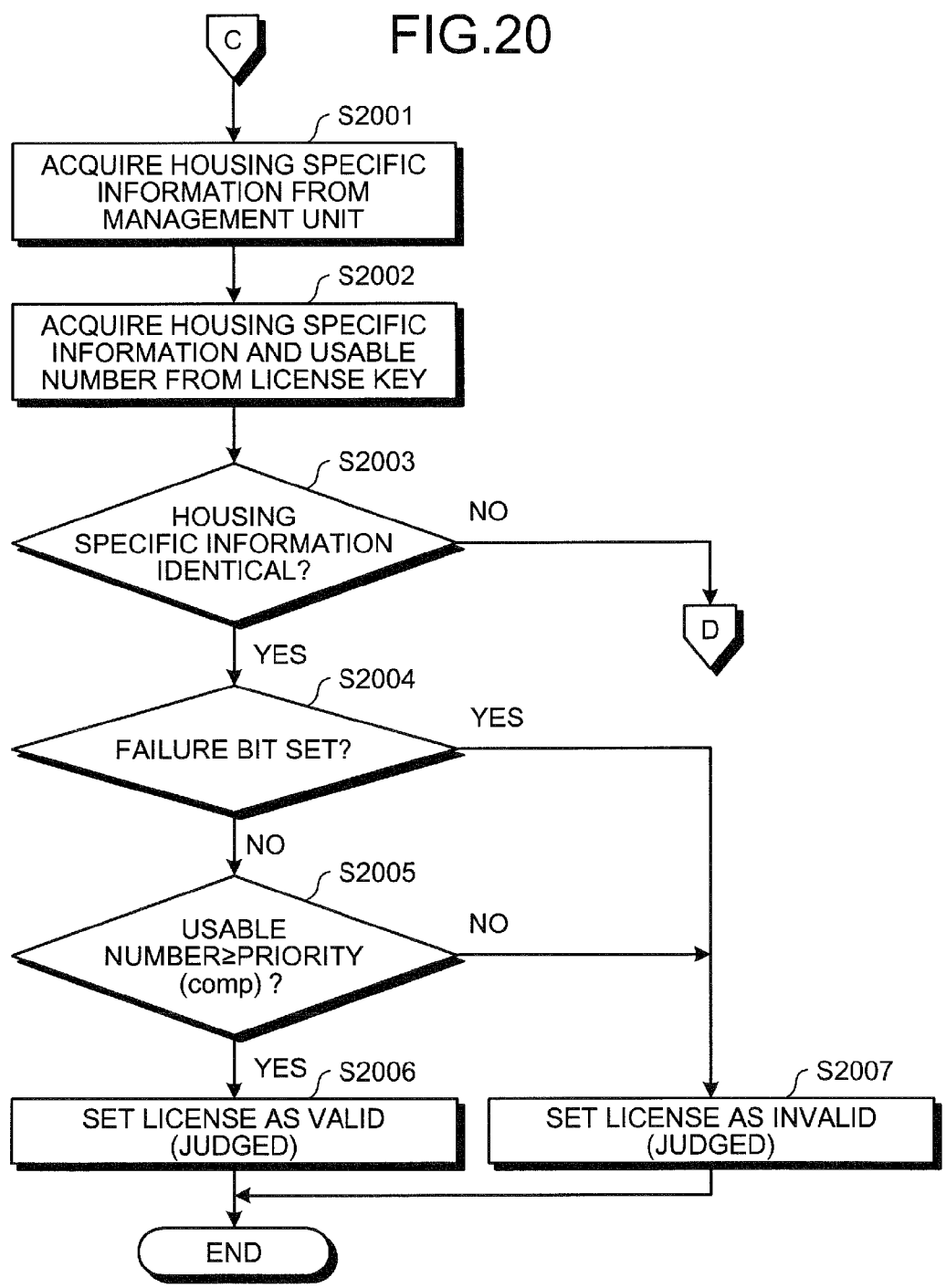
FIG. 20 is a flowchart (part 2) of details of the license activation (steps S606 to S609 of FIG. 6) using the priority (comp) according to the second embodiment.

FIG. 20 is a flowchart (part 2) of details of the license activation (steps S606 to S609 of FIG. 6) using the priority (comp) according to the second embodiment. In FIG. 20, the blade 201 acquires the housing specific information from the management unit 202 and retains the housing specific information in the management table 302a (step S2001). The blade 201 decrypts the license key to acquire and retain the housing specific information and the usable number in the management table 302a (step S2002).

The blade 201 determines whether the decrypted housing specific information is identical to the acquired housing specific information (step S2003). If the decrypted housing specific information is not identical to the acquired housing specific information (step S2003: NO), the license is considered as an authorized license and the blade 201 stops the activation of the blade 201 (step S1905) and terminates the license activation judgment process. If the decrypted housing specific information is identical to the acquired housing specific information (step S2003: YES), the license is considered as an authorized license and the process goes to step S2004.

The blade 201 determines whether the failure bit of the blade 201 is set (step S2004). If the failure bit of the blade 201 is set (step S2004: YES), the blade 201 considers that the blade 201 is in failure, sets the license as invalid (judged) (step S2007), terminates the license activation judgment process, and shifts to the normal operation state. If the failure bit of the blade 201 is not set (step S2004: NO), the blade 201 is in the normal operation state and the process goes to step S2005.

The blade 201 determines whether the usable number retained in the management table 302a thereof≥the priority (comp) is satisfied (step S2005). If the usable number≥the priority (comp) is not satisfied (step S2005: NO), the blade 201 sets the license as invalid (judged) (step S2007), terminates the license activation judgment process, and shifts to the normal operation state. If the usable number≥the priority (comp) is satisfied (step S2005: YES), the blade 201 sets the license as valid (judged) (step S2006), terminates the license activation judgment process, and shifts to the normal operation state.

The license activation judgment process enables the blade 201 to activate the license within a limit of the usable number.

Although the license activation judgment process is executed when the blade 201 is powered on for the first time, the execution of this process may be triggered by addition/replacement of the blade 201 and the execution of the license activation judgment process may be triggered when a failure is detected. In this case, all the blades may execute this process or only the blades 201 having priority lower than the added/replaced blade 201 may execute the license activation judgment process. The license activation judgment process may be repeatedly executed at regular time intervals for prevention of unauthorized use.

The process of calculating the priority (comp) of step S1904 of FIG. 19 will be described. The priority (comp) indicates where the priority of the blade is ranked from the top among all the blades except a blade in failure. In this description, it is assumed that the blade 201 having the priority of a smaller number preferentially activates the license. Therefore, the priority (comp) is a rank when the priorities of the blades are sorted in descending order.

Figure 21:
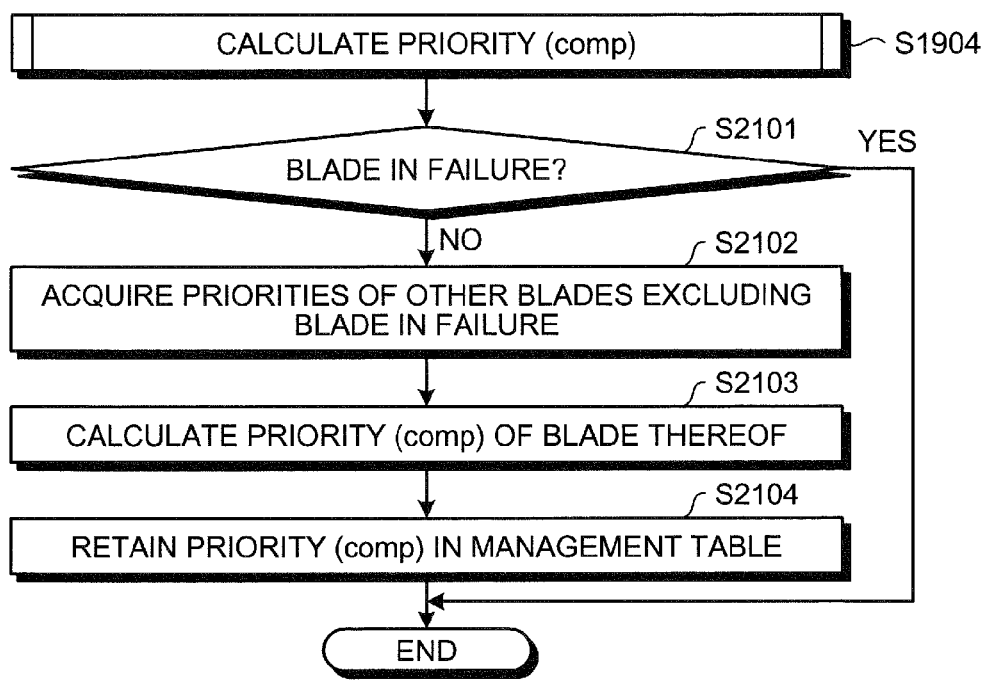
FIG. 21 is a flowchart of a flow of calculation of the priority (comp) described at step S1904 of FIG. 19.

FIG. 21 is a flowchart of a flow of calculation of the priority (comp) described at step S1904 of FIG. 19. The blade 201 determines whether the blade 201 is in failure (step S2101). If the blade 201 is in failure (step S2101: YES), the process of calculating the priority (comp) is terminated.

If the blade 201 is not in failure (step S2101: NO), the blade 201 acquires the priorities of the other blades except the blade 201 in failure (step S2102). The blade 201 sorts the priority thereof retained in the management table 302a and the priorities of the other blades in descending order and calculates the rank thereof as the priority (comp) of the blade 201 (step S2103).

The blade 201 retains the calculated priority (comp) thereof in the management table 302a (step S2104). The blade 201 then terminates the process of calculating the priority (comp). The process of calculating the priority (comp) enables the blade 201 to calculate the priority (comp) thereof. A specific example in the case of calculating the priority (comp) with this process will be described with reference to FIG. 22.

This enables the blades to activate the license within a limit of the usable number in the housing without waiting for the process of the blades 201 having higher priorities. This also enables the blades to automatically activate/deactivate the license according to the priority at the time of replacement/addition/failure of the blade 201.

Figure 22:
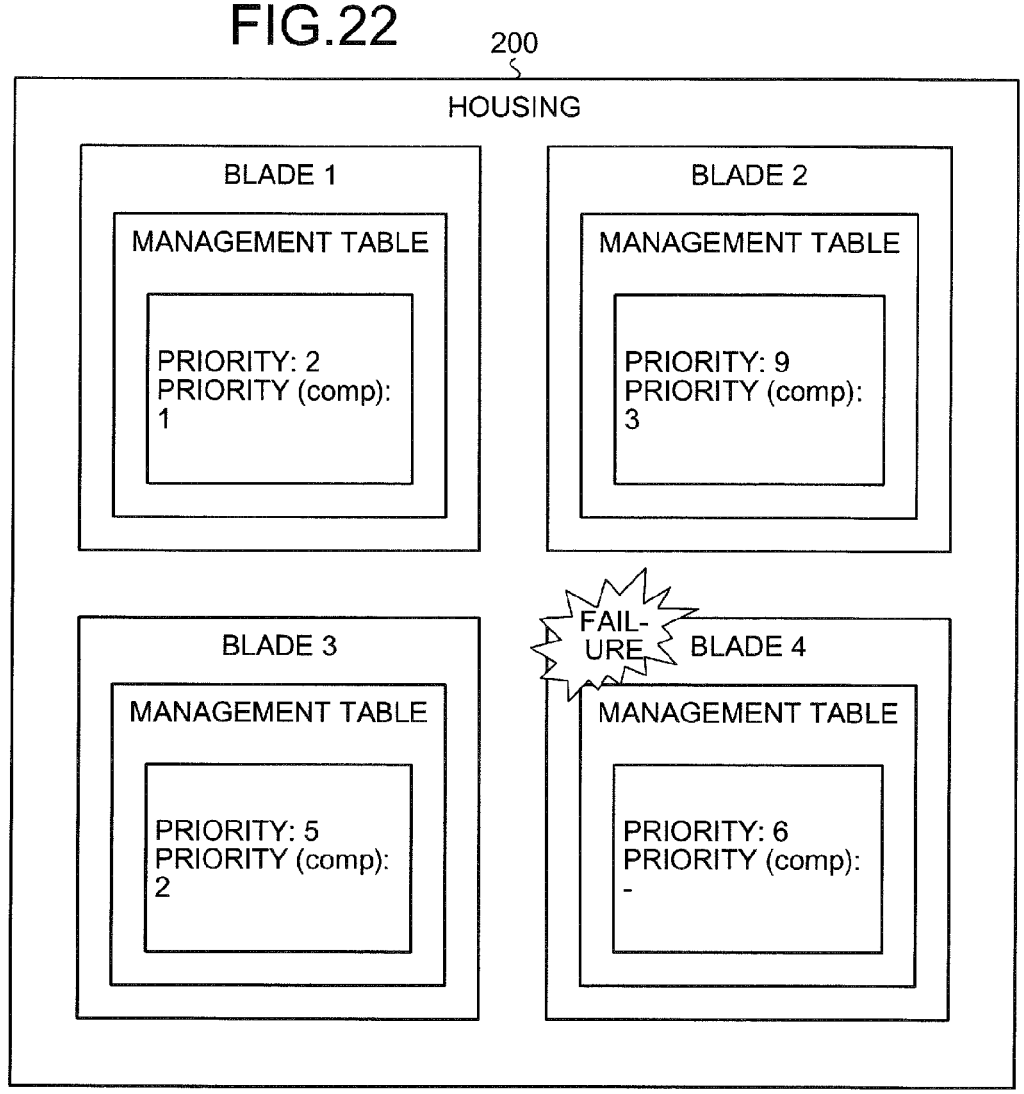
FIG. 22 is an explanatory view of calculation of the priority (comp)

FIG. 22 is an explanatory view of calculation of the priority (comp). As depicted in FIG. 22, for example, it is assumed that the four blades 201 are inserted in the housing 200. The respective blades 201 are referred to as blades 1 to 4. It is assumed that the blades 1, 2, 3, and 4 are set to priority 2, priority 9, priority 5, and priority 4. The blade 4 is in failure (having the failure bit set).

Each of the blades 1 to 3 in the normal operation state acquires the priorities of the other blades except the blade 4 in failure. These priorities are sorted in descending order into "priority 2 (blade 1), priority 5 (blade 3), and priority 9 (blade 2)". Each of the blades 1 to 3 calculates and retains the priority (comp) based on this sorting result in the management table 302a.

In other words, since the blade 1 is ranked at the first place, the blade 1 sets and retains the priority (comp) as one in the management table 302a thereof. Since the blade 2 is ranked at the third place, the blade 2 sets and retains the priority (comp) as three in the management table 302a thereof. Since the blade 3 is ranked at the second place, the blade 3 sets and retains the priority (comp) as two in the management table 302a thereof. On the other hand, the blade 4 in failure does not calculate the priority (comp).

A process in the case of a failure of the blade occurring after shift to the normal operation state will be described. In the second embodiment, the blade 201 detects a failure thereof with the process of failure detection depicted in FIG. 10.

Failure detection may trigger execution of the license activation judgment process in all the blades. For example, the failed blade 201 notifies the other blades of failure detection so that the failed blade 201 and the notified blades 201 execute the license activation judgment process. In this case, only the failed blade 201 and the lower-level blades of the failed blade 201 may execute the license activation judgment process. This eliminates a burden due to the license activation judgment process in the higher-level blades of the failed blade 201. When a failure is detected, announcement of occurrence of a failure may be displayed on a display (not depicted) to notify a user of the necessity of replacement of the blade 201. Middleware may be used for setting a switching destination of the blade 201 at the time of occurrence of a failure such that only the two blades 201 of the switching source and the switching destination execute the license activation judgment process.

If the blade 201 once executing the license activation judgment process executes the license activation judgment process again, the management table 302a of the blade 201 already retains the priority and the license key. Therefore, the blade 201 may start the license activation judgment process from step S2001 of FIG. 20. This accelerates the license activation judgment process. A specific example of the second embodiment will be described with reference to FIGS. 23 to 28.

Figure 23:
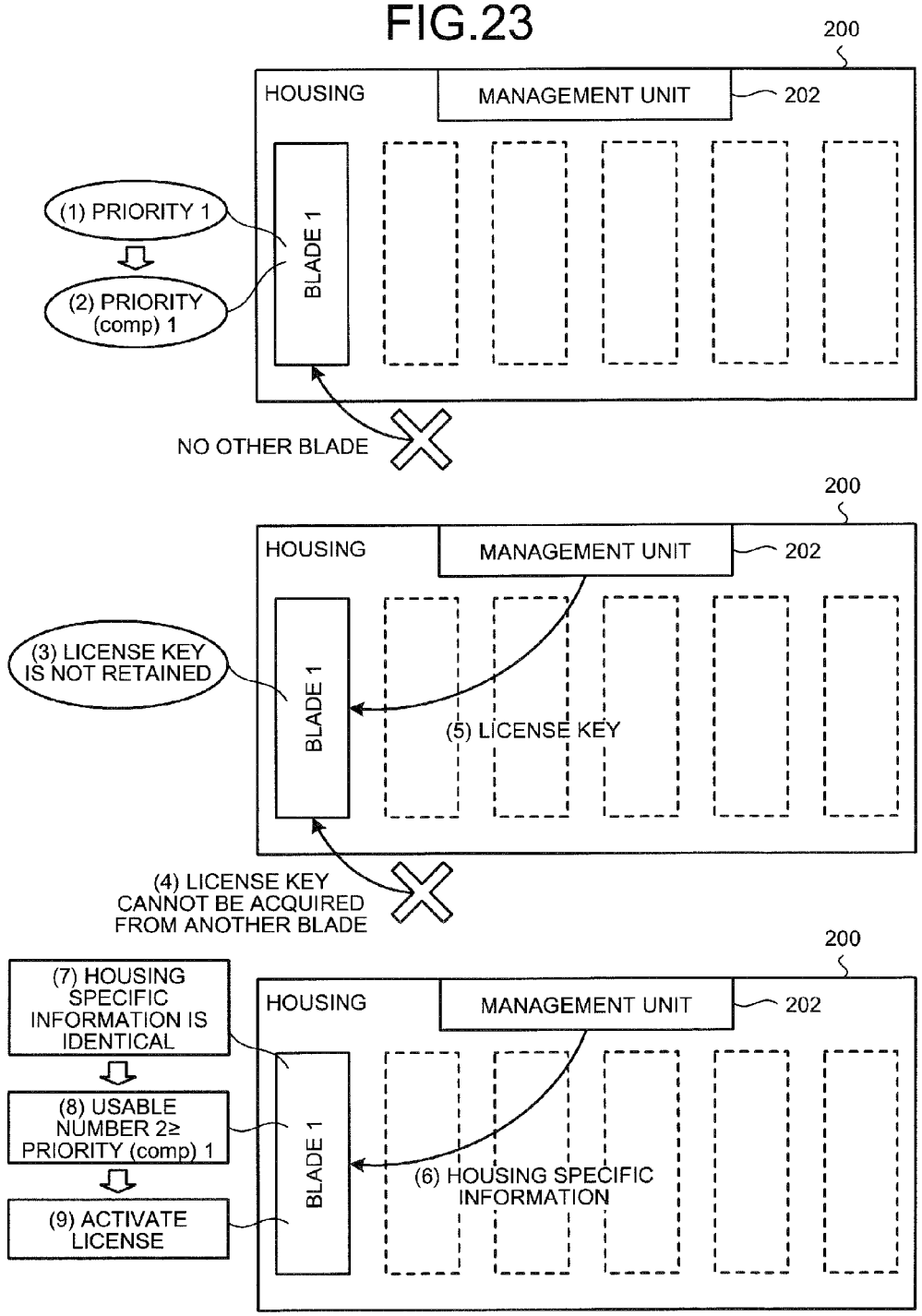

FIGS. 23, 24, 25, 26, 27, and 28 are explanatory views of a specific example of the second embodiment. In FIG. 23, it is assumed that a blade 1 is inserted into the housing 200. The blade 1 retains the priority set by the priority setting SW 304 in the management table 302a (1). The blade 1 calculates the priority (comp) (2). Since no other blade exists, the blade 1 retains the priority (comp) as one in the management table 302a.

Since the license key is not retained in the management table 302a of the blade 1 (3), the blade 1 attempts to acquire the license key from another blade. However, no other blade exists and the license key cannot be acquired from another blade (4). Therefore, the blade 1 waits until the license key is input from a user (5). In this example, it is assumed that the license key is input from the management unit 202.

The blade 1 receives the housing specific information from the management unit 202 (6). The blade 1 decrypts the license key to acquire the housing specific information and the usable number. Since the received housing specific information is identical to the decrypted housing specific information (7), the blade 1 determines that the license key retained in the management table 302a is an authorized license key, and goes to the next process.

The blade 1 compares the usable number with the priority (comp). Since the usable number is two and the priority (comp) is one (8), the blade 1 determines that the license can still be activated. The blade 1 activates the license (9).

It is assumed that a new blade 2 is inserted into the housing 200. In this example, it is assumed that all the blades execute the license activation judgment process in association with the addition of the blade 201.

Figure 24:
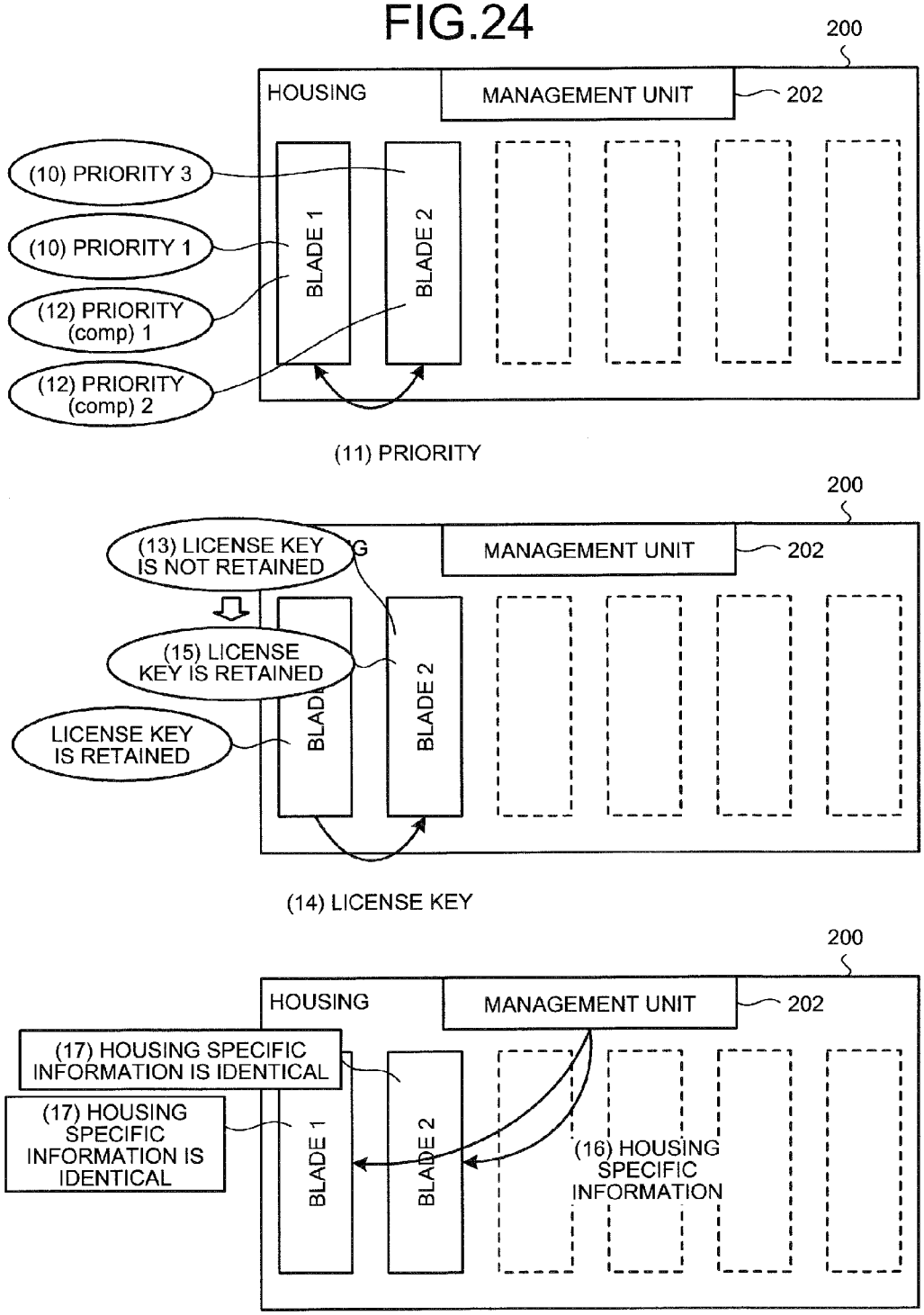

In FIG. 24, each blade retains priority set by the priority setting SW 304 in the management table 302a (10). Each blade acquires and retains the priority from the other blade into the memory 302 (11). Each blade calculates the priority (comp) (12). Since the priority of the blade 1 is one and the priority of the blade 2 is three, the priority (comp) of the blade 1 is one and the priority (comp) of the blade 2 is two. Each blade retains the priority (comp) in the management table 302a.

Since the license key is not retained in the management table 302a of the blade 2 (13), the blade 2 attempts to acquire the license key from the other blade (in this case, the blade 1) (14). The blades 2 receives and retains the license key from the blade 1 into the management table 302a (15).

Each blade receives the housing specific information from the management unit 202 (16). Each blade decrypts the license key to acquire the housing specific information and the usable number. Since the received housing specific information is identical to the decrypted housing specific information (17), each blade determines that the license key retained in the management table 302a is an authorized license key, and goes to the next process.

Figure 25:
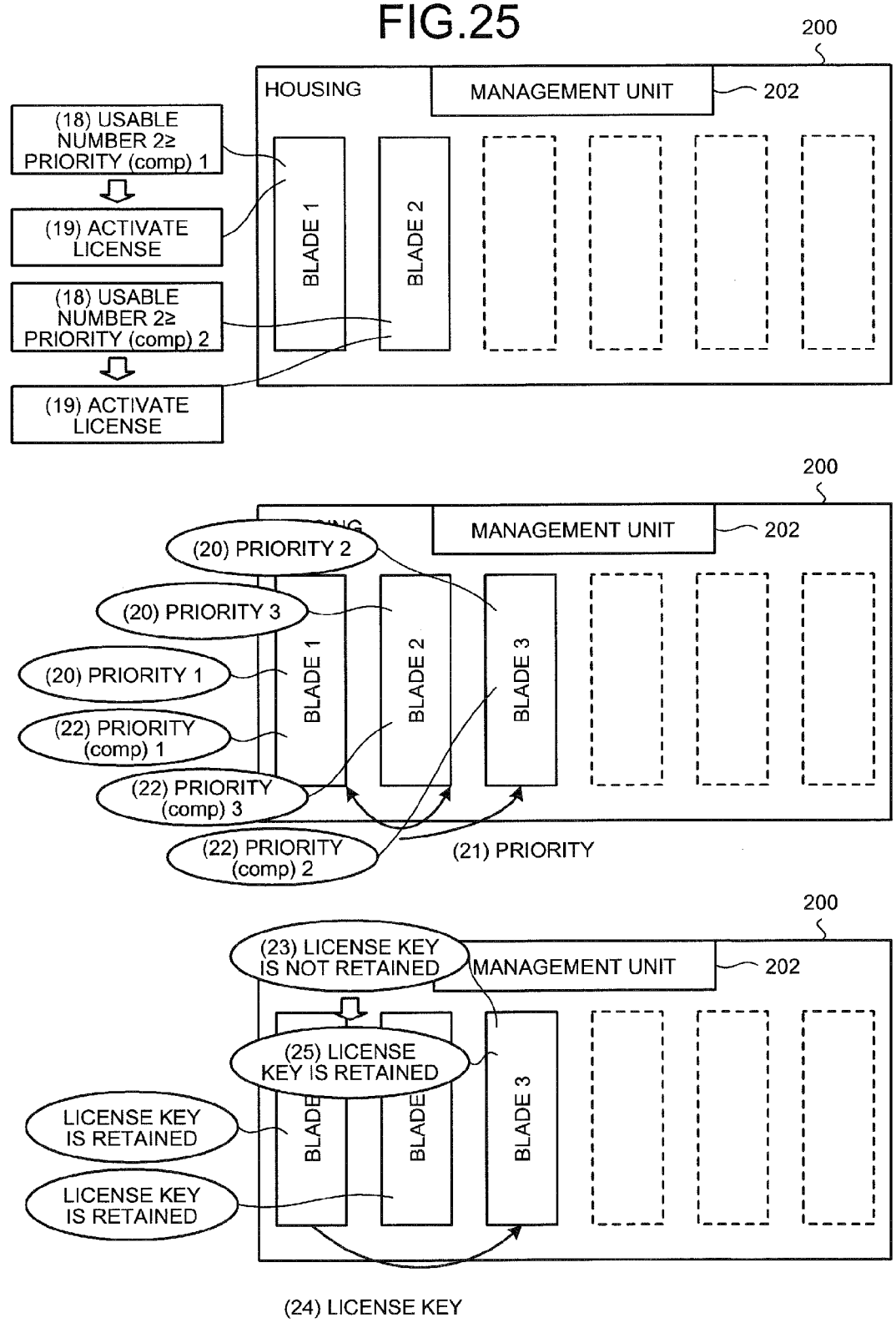

In FIG. 25, each blade compares the usable number with the priority (comp). Since the blade 1 has the usable number of two and the priority (comp) of one, the blade 1 determines that the license can still be activated. Since the blade 2 has the usable number of two and the priority (comp) of two, the blade 2 determines that the license can still be activated (18). The blades activate the license (19).

It is assumed that a new blade 3 is inserted into the housing 200. In this example, it is assumed that all the blades execute the license activation judgment process in association with the addition of the blade 201.

Each blade retains priority set by the priority setting SW 304 in the management table 302a (20). Each blade acquires and retains the priorities from the other blades into the memory 302 (21). Each blade calculates the priority (comp) (22). Since the blades 1, 2, and 3 have the priorities of one, three, and two, respectively, the blades 1 has the priority (comp) of one; the blades 2 has the priority (comp) of three; and the blades 3 has the priority (comp) of two. Each blade retains the priority (comp) in the management table 302a.

Since the license key is not retained in the management table 302a of the blade 3 (23), the blade 3 attempts to acquire the license key from the other blade (in this case, the blade 1) (24). The blades 3 receives and retains the license key from the blade 1 into the management table 302a (25).

In FIG. 26, each blade receives the housing specific information from the management unit 202 (26). Each blade decrypts the license key to acquire the housing specific information and the usable number. Since the received housing specific information is identical to the decrypted housing specific information (27), each blade determines that the license key retained in the management table 302a is an authorized license key, and goes to the next process.

Each blade compares the usable number with the priority (comp). Since the usable number is two and the priority (comp) is one, the blade 1 determines that the license can still be activated. Since the usable number is two and the priority (comp) is three, the blade 2 determines that the license cannot be activated. Since the usable number is two and the priority (comp) is two, the blade 3 determines that the license can still be activated (28). The blades 1 and 3 activate the license and the blade 2 deactivate the license (29).

The case of a failure occurring in the blade 1 will be described. In this description, it is assumed that all the blades execute the license activation judgment process in association with the occurrence of the failure in the blade 201.

In FIG. 27, when detecting a failure, the blade 1 sets the failure bit to one and retains the failure bit in the management table 302a (30). The blade 1 notifies the other blades of the detection of the failure. The blade 1 detecting the failure and the blades 2 and 3 notified of the detection of the failure start the license activation judgment process.

Each blade retains priority set by the priority setting SW 304 in the management table 302a (31). Each blade acquires and retains the priorities from the other blades into the memory 302 (32). The priority (comp) is calculated (33). Although the blades 1, 2, and 3 have the priorities of one, three, and two, respectively, the failed blade 1 is excluded from the calculation of the priority (comp). Therefore, the blade 1 does not have the priority (comp); the blade 2 has the priority (comp) of two; and the blade 2 has the priority (comp) of one. Each blade retains the priority (comp) in the management table 302a.

Each blade retains the license key and therefore directly goes to the next process. Each blade receives the housing specific information from the management unit 202 (34). Each blade decrypts the license key to acquire the housing specific information and the usable number. Since the received housing specific information is identical to the decrypted housing specific information (35), each blade determines that the license is authorized, and goes to the next process.

In FIG. 28, each blade compares the usable number with the priority (comp). Since the failure bit is set, the blade 1 determines that the license is deactivated. Since the usable number is two and the priority (comp) is two, the blade 2 determines that the license can still be activated. Since the usable number is two and the priority (comp) is one, the blade 3 determines that the license can still be activated (36). The blades 2 and 3 activate the license and the blade 1 deactivate the license (37).

As described above, the license can automatically be activated/deactivated according to the priority at the time of addition/failure of the blade 201.

Figure 29A:
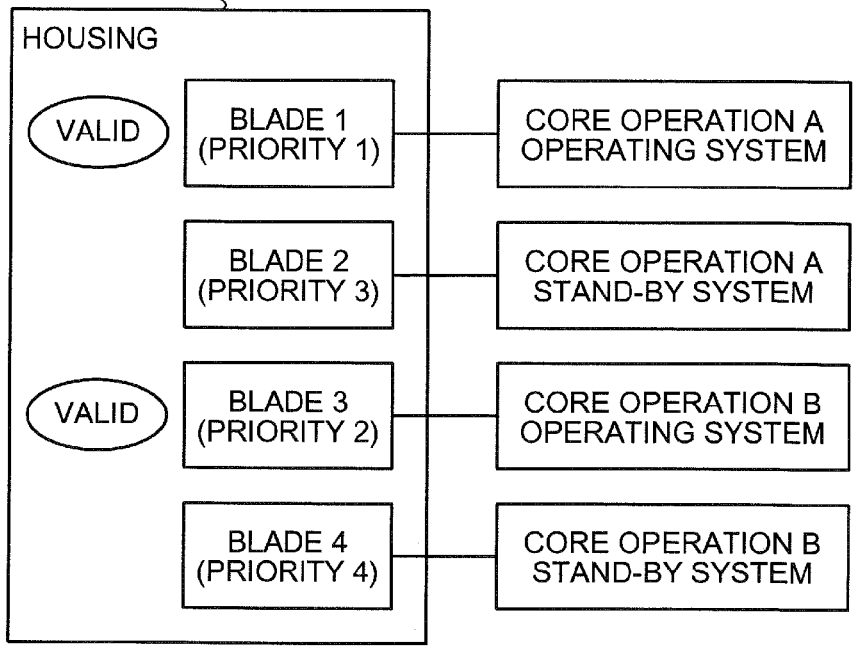
FIGS. 29A and 29B are explanatory views (part 1) a practical example of the first and the second embodiments.
Figure 29B:
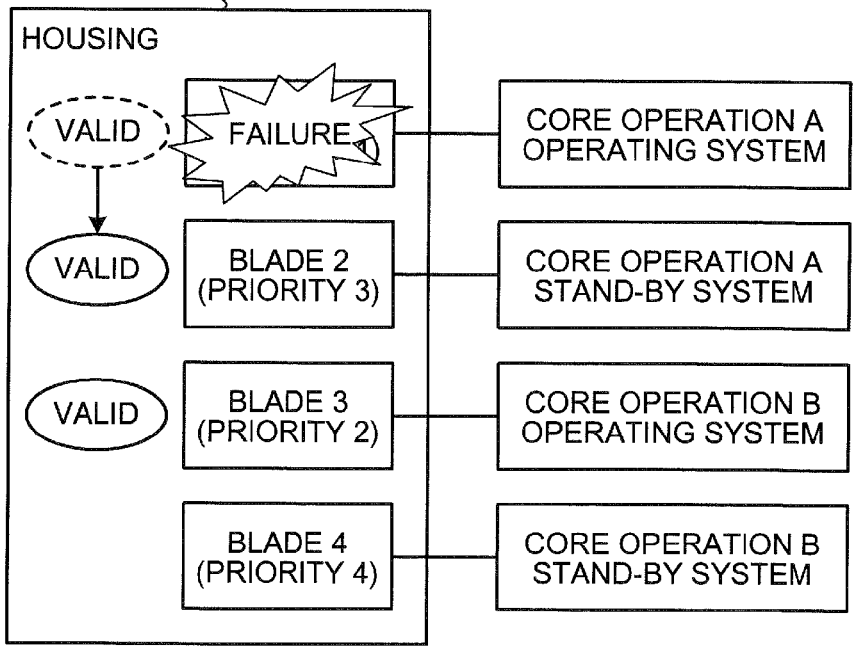

FIGS. 29A and 29B are explanatory views (part 1) of a practical example of the first and second embodiments. In this description, it is assumed that the blade 201 having the priority of a smaller number preferentially activates the license. Each of the blades 201 has the priority set by the priority setting SW 304.

FIGS. 29A and 29B depict an example when the blades 201 of an operating system and the blades 201 of a stand-by system are prepared and the blades 201 of the stand-by system take over the license if a failure occurs. The four blades 201 are present and the usable number is two. The respective blades 201 are referred to as blades 1 to 4. The blades 1 and 3 of the operating system have the priorities set higher.

Therefore, as depicted in FIG. 29A, the license is normally activated in the blades 1 and 3 of the operating system. On the other hand, as depicted in FIG. 29B, if the blade 1 of the operating system is failed, the blade 2 of the stand-by system automatically takes over the license, thereby enabling smooth maintenance.

Figure 30A:
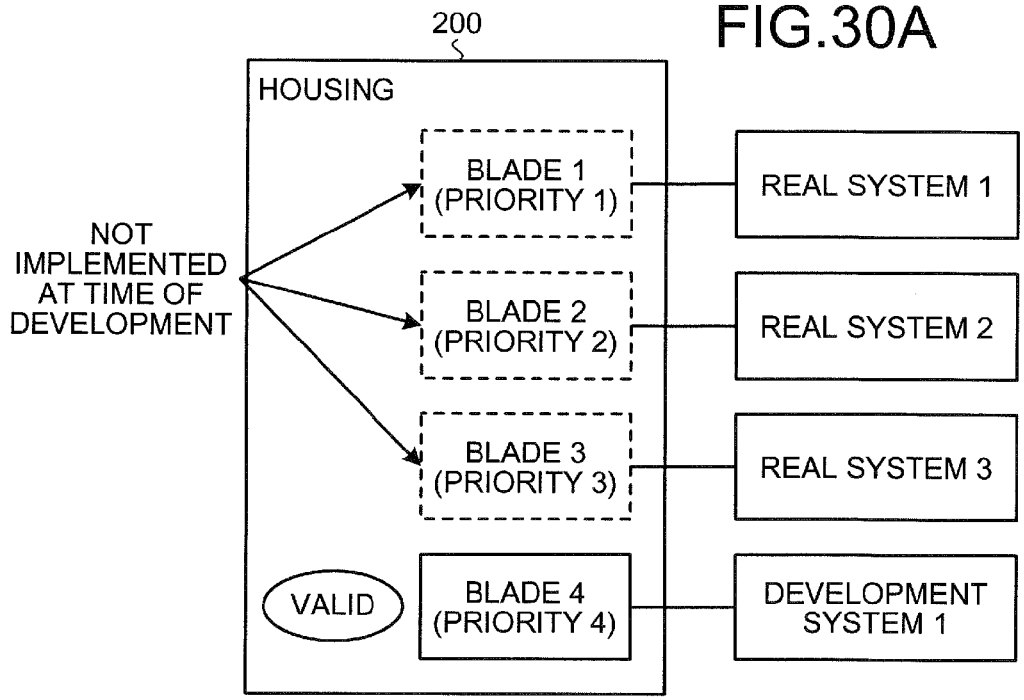
FIGS. 30A and 30B are explanatory views (part 2) of a practical example of the first and second embodiments.
Figure 30B:
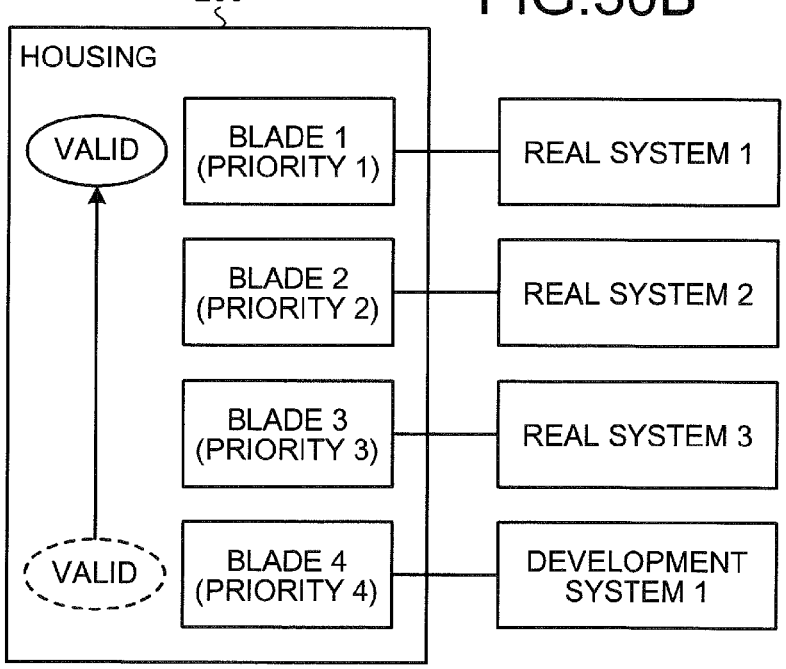

FIGS. 30A and 30B are explanatory views (part 2) of a practical example of the first and second embodiments. In this description, it is assumed that the blade 201 having the priority of a smaller number preferentially activates the license. Each of the blades has the priority set by the priority setting SW 304.

FIGS. 30A and 30B depict an example when the blades 201 of a real system and the blades 201 of a development system are prepared and the blades 201 of the real system are used in association with completion of development. Four blades are present and the usable number is one. The respective blades 201 are referred to as blades 1 to 4. The blades 1 to 3 of the real system have the priorities set higher and the blade 4 of the development system has the priority set lower. Therefore, although the license is not activated in the blades 1 to 3 of the real system as depicted in FIG. 30A before completion of development, the license is automatically taken over in association with completion of development as depicted in FIG. 30, thereby enabling smooth maintenance.

In the second embodiment, each blade calculates the priority (comp) to determine whether software or an optional function of the software is usable. Therefore, the license can be activated to use the software or the optional function of the software without waiting for the license activation judgment process of another blade. Since the priority (comp) is used for preventing the usage number from exceeding the usable number, any of the blades 201 can freely activate the license within a limit of the usable number to use the software or the optional function of the software.

Since the blades mutually monitor the usage number, it is not necessary to dispose a license management unit on the outside and the cost can be reduced. The mutual monitoring of the usage number by the blades eliminates the risk of unauthorized use of the software or the optional function of the software through improper modification of the license management unit. Since it is not necessary to dispose a license management unit on the outside, operation can be prevented from stopping due to failure of the license management unit.

Since the license key is locked to the housing specific information, the software or the optional function of the software can be prevented from being used without authorization by detaching the blade 201 from the bus 203.

In the second embodiment, if a failure is detected, the license activation judgment process is executed again to deactivate the license of the failed blade 201 and, therefore, prompt maintenance can automatically be performed.

The management method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The blade, the computer product, and the management method according to the present invention effect flexible licensed operation while preventing unauthorized use of software.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A blade removable from a housing of a blade server, the blade comprising a processor configured to:
    receive from another blade in the housing, a first license number indicative of a number of licenses that can use a function of given software and identification information specific to the housing;
    acquire from the housing, identification information specific to the housing;
    determine whether the received identification information is identical to the acquired identification information, and upon determining the identification information to be identical, further determine whether the function of the given software is usable by comparing the first license number with a second license number indicative of a number of blades in the blade sever using the function of the given software;
    set the blade to a state in which the function of the given software is executable upon determining that the function of the given software is usable;
    update the second license number upon setting the blade; and
    transmit to a blade in which the function of the given software is not set among the blades in the blade server, the first license number and the updated second license number.

2. The blade according to claim 1, wherein
    the process, if the blade server has no blade in which the function of the given software is set, receives the first license number from an issuer of the first license number.

3. The blade according to claim 1, wherein
    the processor, based on priority set to the blades in the blade server, transmits the first and second license numbers to a blade having the priority subsequent to the blade thereof among blades in which the function of the given software is not set.

4. The blade according to claim 2, wherein
    the processor, based on priority set to the blades in the blade server, transmits the first and second license numbers to a blade having the priority subsequent to the blade thereof among blades in which the function of the given software is not set.

5. A blade removable from a housing of a blade server, the comprising a processor configured to:
    receive from another blade in the housing, a license number indicative of a number of licenses that can use a function of given software and identification information specific to the housing;
    acquire from the housing, identification information specific to the housing, and acquire from blades in the housing, priority set to the blades;
    convert the acquired priority of the blade into a number corresponding to the priority of the blade;
    determine whether the received identification information is identical to the acquired identification information, upon determining the identification information to be identical, determine whether the function of the given software is usable by comparing the license number with the converted number corresponding to the blade; and
    set the blade to a state in which the function of the given software is executable upon determining that the function of the given software is usable.

6. The blade according to claim 1, the processor further configured to
    detect failure of the blade, wherein
    the processor upon detecting failure, sets the blade to a state in which the function of the given software cannot be executed and does not determine whether the received identification information is identical to the acquired identification information.

7. The blade according to claim 5, the processor further configured to
   detect failure of the blade, wherein
   the processor upon detecting failure, sets the blade to a state in which the function of the given software cannot be executed and does not determine whether the received identification information is identical to the acquired identification information.

8. A non-transitory computer-readable recording medium storing a management program causing a blade that is removable from a housing of a blade server to execute a process comprising:
   receiving from another blade in the housing, a first license number indicative of a number of licenses that can use a function of given software and identification information specific to the housing;
   acquiring from the housing, identification information specific to the housing;
   determining whether the received identification information is identical to the acquired identification information, and upon determining the identification information to be identical, further determining whether the function of the given software is usable by comparing the first license number with a second license number indicative of a number of blades in the blade sever using the function of the given software;
   setting the blade to a state in which the function of the given software is executable upon determining that the function of the given software is usable;
   updating the second license number upon setting the blade; and
   transmitting to a blade in which the function of the given software is not set among the blades in the blade server, the first license number and the updated second license number.

9. A non-transitory computer-readable recording medium storing a management program causing a blade that is removable from a housing of a blade server to execute a process comprising:
   receiving from another blade in the housing, a license number indicative of a number of licenses that can use a function of given software and identification information specific to the housing;
   acquiring from the housing, identification information specific to the housing, and acquiring from blades in the housing, priority set to the blades;
   converting the acquired priority of the blade into a number corresponding to the priority of the blade;
   determining whether the received identification information is identical to the acquired identification information, and upon determining the identification information to be identical, determining whether the function of the given software is usable by comparing the license number with the converted number corresponding to the blade; and
   setting the blade to a state in which the function of the given software is executable upon determining that the function of the given software is usable.

10. A management method executed by a blade that is removable from a housing of a blade server, the management method comprising:
    receiving from another blade in the housing, a first license number indicative of a number of licenses that can use a function of given software and identification information specific to the housing;
    acquiring from the housing, identification information specific to the housing;
    determining whether the received identification information is identical to the acquired identification information, and upon determining the identification information to be identical, further determining whether the function of the given software is usable by comparing the first license number with a second license number indicative of a number of blades in the blade sever using the function of the given software;
    setting the blade to a state in which the function of the given software is executable upon determining that the function of the given software is usable;
    updating the second license number upon setting the blade; and
    transmitting to a blade in which the function of the given software is not set among the blades in the blade server, the first license number and the updated second license number.

11. A management method executed by a blade that is removable from a housing of a blade server, the management method comprising:
    receiving from another blade in the housing, a license number indicative of a number of licenses that can use a function of given software and identification information specific to the housing;
    acquiring from the housing, identification information specific to the housing, and acquiring from blades in the housing, priority set to the blades;
    converting the acquired priority of the blade into a number corresponding to the priority of the blade;
    determining whether the received identification information is identical to the acquired identification information, and upon determining the identification information to be identical, determining whether the function of the given software is usable by comparing the license number with the converted number corresponding to the blade; and
    setting the blade to a state in which the function of the given software is executable upon determining that the function of the given software is usable.

* * * * *